US012443133B2

(12) United States Patent
Adachi et al.

(10) Patent No.: US 12,443,133 B2
(45) Date of Patent: Oct. 14, 2025

(54) FIXING DEVICE AND IMAGE FORMING APPARATUS INCORPORATING SAME WITH A BIASING MEMBER ASSEMBLED INTO THE HOUSING VIA A RESISTOR

(71) Applicants: Tomoya Adachi, Kanagawa (JP); Yuusuke Furuichi, Kanagawa (JP)

(72) Inventors: Tomoya Adachi, Kanagawa (JP); Yuusuke Furuichi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 18/716,840

(22) PCT Filed: Dec. 20, 2022

(86) PCT No.: PCT/IB2022/062561

§ 371 (c)(1),
(2) Date: Jun. 7, 2024

(87) PCT Pub. No.: WO2023/144616

PCT Pub. Date: Aug. 3, 2023

(65) Prior Publication Data

US 2025/0036053 A1 Jan. 30, 2025

(30) Foreign Application Priority Data

Jan. 28, 2022 (JP) ................................ 2022-012017

(51) Int. Cl.
*G03G 15/20* (2006.01)

(52) U.S. Cl.
CPC ..... *G03G 15/2053* (2013.01); *G03G 15/2064* (2013.01)

(58) Field of Classification Search
USPC .......................................................... 399/323
See application file for complete search history.

(56) References Cited

U.S. PATENT DOCUMENTS

2006/0088346 A1* 4/2006 Swanson ............ G03G 15/2028 399/323
2008/0124140 A1* 5/2008 Thomas ............. G03G 15/2028 399/323

(Continued)

FOREIGN PATENT DOCUMENTS

JP 11272090 A * 10/1999
JP 2009-109574 A 5/2009

(Continued)

OTHER PUBLICATIONS

English abstract for JP11-272090A to Nakano, published Oct. 1999.*

(Continued)

*Primary Examiner* — Quana Grainger
(74) *Attorney, Agent, or Firm* — XSENSUS LLP

(57) ABSTRACT

A fixing device includes a rotator (20, 120), an opposed rotator (21, 93), a heater (22), a housing (40), a resistor (42), a separator (41), and a biasing member (44). The opposed rotator is opposite the rotator. The heater includes a resistive heat generator (31). The heater is in direct contact with the inner circumferential surface of the rotator or in contact with the inner circumferential surface of the rotator via a conductive member (28, 36) to heat the rotator. The housing is conductive and grounded. The resistor is in the housing. The separator is conductive and is in contact with the rotator. The separator is assembled into the housing via the resistor. The biasing member biases the separator against the rotator. The biasing member is assembled into the housing via the resistor.

17 Claims, 18 Drawing Sheets

(56) References Cited

U.S. PATENT DOCUMENTS

| | | | | |
|---|---|---|---|---|
| 2009/0110452 | A1 | 4/2009 | Ogata | |
| 2015/0139709 | A1* | 5/2015 | Ohta .................. | G03G 15/2053 399/329 |
| 2021/0003946 | A1 | 1/2021 | Takahashi et al. | |
| 2022/0179338 | A1 | 6/2022 | Seshita et al. | |
| 2022/0283530 | A1 | 9/2022 | Adachi et al. | |
| 2022/0291610 | A1 | 9/2022 | Seki et al. | |
| 2022/0299920 | A1 | 9/2022 | Shimada et al. | |
| 2022/0308511 | A1 | 9/2022 | Someya et al. | |

FOREIGN PATENT DOCUMENTS

| | | | |
|---|---|---|---|
| JP | 2011-028081 | A | 2/2011 |
| JP | 2018-049298 | A | 3/2018 |
| JP | 2023-004078 | A | 1/2023 |

OTHER PUBLICATIONS

International Search Report and Written Opinion issued on Apr. 4, 2023 in PCT/IB2022/062561 filed on Dec. 20, 2022, 9 pages.

* cited by examiner

FIXING DEVICE AND IMAGE FORMING APPARATUS INCORPORATING SAME WITH A BIASING MEMBER ASSEMBLED INTO THE HOUSING VIA A RESISTOR

TECHNICAL FIELD

Embodiments of the present disclosure generally relate to a fixing device and an image forming apparatus incorporating the fixing device.

BACKGROUND ART

A fixing device includes a fixing belt as a fixing rotator and a heater to heat the fixing belt. One type of the heater includes a base and a resistive heat generator formed on the base. Applying an alternating current (AC) voltage to the resistive heat generator generates heat. The heat heats the inner circumferential surface of the fixing belt via an insulation layer or the like. The fixing device includes a pressure roller that forms a fixing nip between the fixing belt and the pressure roller. A sheet as a recording medium passes through the fixing nip. The fixing device includes a separator to separate the sheet from the fixing belt. For example, PTL1 discloses the separator made of metal.

If the insulation layer on the heater is broken, a current flows from the heater to a housing of the fixing device via the fixing belt, the separator that is electrically conductive, and a biasing member biasing the separator, which affects the amount of heat generated by the heater or adversely affects peripheral members.

CITATION LIST

Patent Literature

[PTL 1]
Japanese Patent No. 6422563

SUMMARY OF INVENTION

Technical Problem

An object of the present disclosure is to secure a certain degree of insulation between a separator and a housing of a fixing device and between a biasing member and the housing, which limits a current flowing from a heater to the housing so that the current does not affect the amount of heat generated by the heater and adversely affect peripheral members even if an insulation layer on the heater is broken.

Solution to Problem

A fixing device includes a rotator, an opposed rotator, a heater, a housing, a resistor, a separator, and a biasing member. The opposed rotator is opposite the rotator. The heater includes a resistive heat generator. The heater is in direct contact with the inner circumferential surface of the rotator or in contact with the inner circumferential surface of the rotator via a conductive member to heat the rotator. The housing is conductive and grounded. The resistor is in the housing. The separator is conductive and is in contact with the rotator. The separator is assembled into the housing via the resistor. The biasing member biases the separator against the rotator. The biasing member is assembled into the housing via the resistor.

Advantageous Effects of Invention

According to the present disclosure, it is possible to secure a certain degree of insulation between the separator and the housing and between the biasing member and the housing.

BRIEF DESCRIPTION OF DRAWINGS

A more complete appreciation of the embodiments and many of the attendant advantages and features thereof can be readily obtained and understood from the following detailed description with reference to the accompanying drawings

Figure 1:
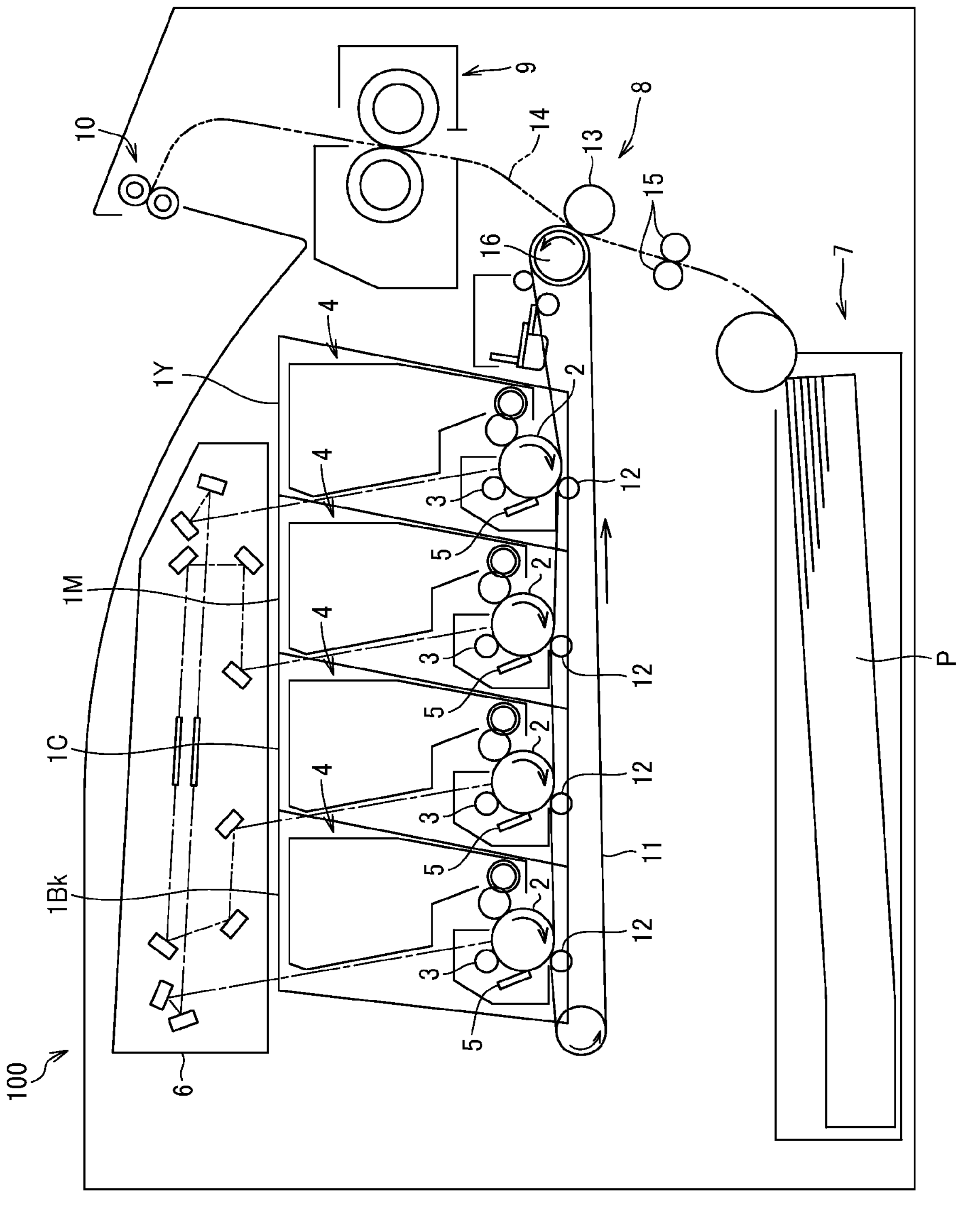
FIG. 1 is a schematic sectional view of an image forming apparatus according to an embodiment of the present disclosure.

The accompanying drawings are intended to depict example embodiments of the present invention and should not be interpreted to limit the scope thereof. The accompanying drawings are not to be considered as drawn to scale unless explicitly noted. Also, identical or similar reference numerals designate identical or similar components throughout the several views.

DESCRIPTION OF EMBODIMENTS

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result. Referring now to the drawings, embodiments of the present disclosure are described below. As used herein, the singular forms "a," "an," and "the" are intended to include the plural forms as well, unless the context clearly indicates otherwise. In the drawings illustrating the following embodiments, the same reference numbers are allocated to elements having the same function or shape and redundant descriptions thereof are omitted below.

FIG. 1 is a schematic sectional view of an image forming apparatus according to an embodiment of the present disclosure. The image forming apparatus 100 according to the present embodiment includes a fixing device as an example of a heating device of the present disclosure. The fixing device fixes a toner image on a sheet onto the sheet.

The image forming apparatus 100 illustrated in FIG. 1 includes four image forming units 1Y, 1M, 1C, and 1Bk detachably attached to an image forming apparatus body. The image forming units 1Y, 1M, 1C, and 1Bk have substantially the same configuration except for containing different color developers, i.e., yellow (Y), magenta (M), cyan (C), and black (Bk) toners, respectively. The colors of the developers correspond to color separation components of full-color images. Each of the image forming units 1Y, 1M, 1C, and 1Bk includes a drum-shaped photoconductor 2 as an image bearer, a charging device 3, a developing device 4, and a cleaning device 5. The charging device 3 charges the surface of the photoconductor 2. The developing device 4 supplies the toner as the developer to the surface of the photoconductor 2 to form a toner image. The cleaning device 5 cleans the surface of the photoconductor 2.

The image forming apparatus 100 includes an exposure device 6, a sheet feeder 7, a transfer device 8, a fixing device 9 as a heating device, and a sheet ejection device 10. The exposure device 6 exposes the surface of the photoconductor 2 to form an electrostatic latent image on the surface of the photoconductor 2. The sheet feeder 7 supplies a sheet P as a recording medium to a sheet conveyance path 14. The transfer device 8 transfers the toner images formed on the photoconductors 2 onto the sheet P. The fixing device 9 fixes the toner image transferred onto the sheet P to the surface of the sheet P. The sheet ejection device 10 ejects the sheet P outside the image forming apparatus 100. The image forming units 1Y, 1M, 1C, and 1Bk, the photoconductors 2, the charging devices 3, the exposure device 6, the transfer device 8, and the like configure an image forming device that forms the toner image on the sheet P.

The transfer device 8 includes an intermediate transfer belt 11 having an endless form and serving as an intermediate transferor, four primary transfer rollers 12 serving as primary transferors, and a secondary transfer roller 13 serving as a secondary transferor. The intermediate transfer belt 11 is stretched by a plurality of rollers. Each of the four primary transfer rollers 12 transfers the toner image from each of the photoconductors 2 onto the intermediate transfer belt 11. The secondary transfer roller 13 transfers the toner image transferred onto the intermediate transfer belt 11 onto the sheet P. The four primary transfer rollers 12 are in contact with the respective photoconductors 2 via the intermediate transfer belt 11. Thus, the intermediate transfer belt 11 contacts each of the photoconductors 2, forming a primary transfer nip between the intermediate transfer belt 11 and each of the photoconductors 2. The secondary transfer roller 13 contacts, via the intermediate transfer belt 11, one of the plurality of rollers around which the intermediate transfer belt 11 is stretched. Thus, a secondary transfer nip is formed between the secondary transfer roller 13 and the intermediate transfer belt 11.

A timing roller pair 15 is disposed between the sheet feeder 7 and the secondary transfer nip defined by the secondary transfer roller 13 in the sheet conveyance path 14.

Referring to FIG. 1, a description is provided of printing processes performed by the image forming apparatus 100 described above.

When the image forming apparatus 100 receives an instruction to start printing, a driver drives and rotates the photoconductor 2 clockwise in FIG. 1 in each of the image forming units 1Y, 1M, 1C, and 1Bk. The charging device 3 charges the surface of the photoconductor 2 uniformly at a high electric potential. Next, the exposure device 6 exposes the surface of each photoconductor 2 based on image data of the document read by the document reading device or print data instructed to be printed from the terminal. As a result, the potential of the exposed portion on the surface of each photoconductor 2 decreases, and an electrostatic latent image is formed on the surface of each photoconductor 2. The developing device 4 supplies toner to the electrostatic latent image formed on the photoconductor 2, forming a toner image thereon.

The toner image formed on each of the photoconductors 2 reaches the primary transfer nip defined by each of the primary transfer rollers 12 in accordance with rotation of each of the photoconductors 2. The toner images are sequentially transferred and superimposed onto the intermediate transfer belt 11 that is driven to rotate counterclockwise in FIG. 1 to form a full color toner image. Thereafter, the full color toner image formed on the intermediate transfer belt 11 is conveyed to the secondary transfer nip defined by the secondary transfer roller 13 in accordance with rotation of the intermediate transfer belt 11. The full color toner image is transferred onto the sheet P conveyed to the secondary transfer nip. The sheet P is supplied from the sheet feeder 7. The timing roller pair 15 temporarily halts the sheet P supplied from the sheet feeder 7. Thereafter, the timing roller pair 15 conveys the sheet P to the secondary transfer nip so that the sheet P meets the full color toner image formed on the intermediate transfer belt 11 at the secondary transfer nip. Thus, the full color toner image is transferred onto and borne on the sheet P. After the toner image is transferred from each of the photoconductors 2 onto the intermediate transfer belt 11, each of cleaning devices 5 removes residual toner on each of the photoconductors 2.

After the toner image is transferred onto the sheet P, the sheet P is conveyed to the fixing device 9 to fix the toner image on the sheet P. Thereafter, the sheet ejection device 10 ejects the sheet P onto the outside of the image forming apparatus 100, thus finishing a series of printing processes.

Next, a configuration of the fixing device 9 is described.

Figure 2:
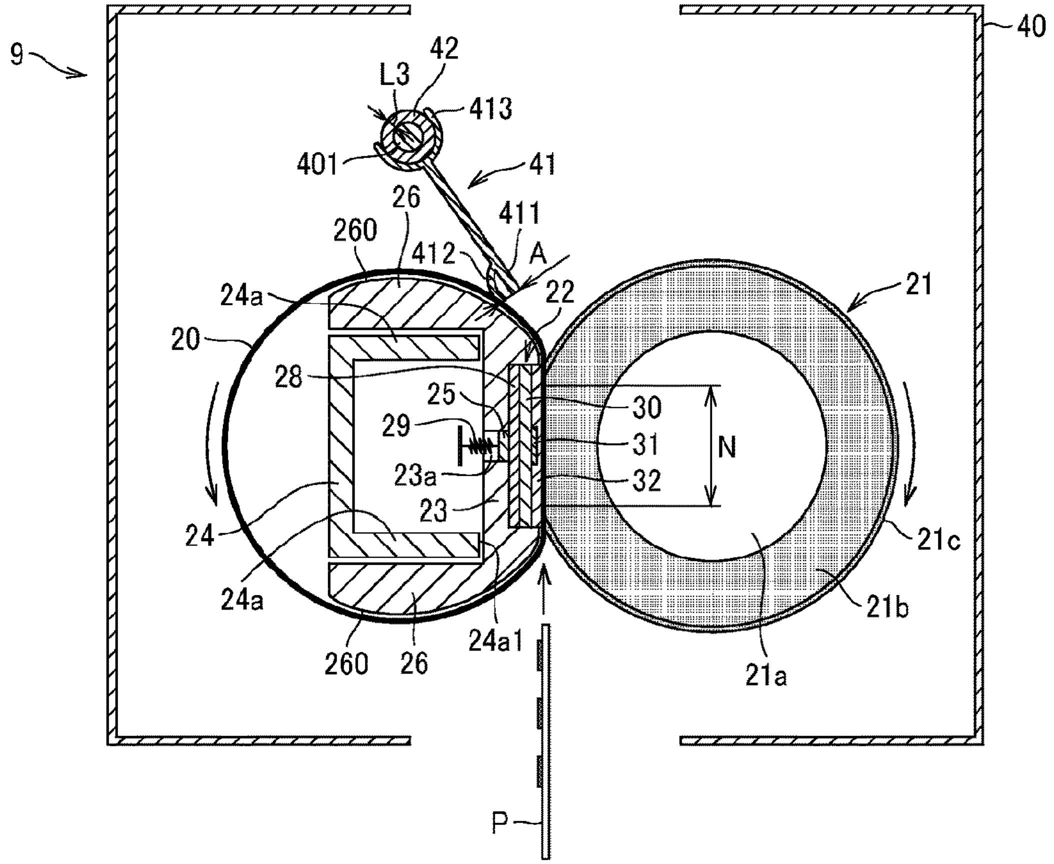
FIG. 2 is a schematic sectional side view of a fixing device incorporated in the image forming apparatus of FIG. 1.

As illustrated in FIG. 2, the fixing device 9 according to the present embodiment includes a fixing device frame 40 as a housing, a fixing belt 20, a pressure roller 21, a heater 22 as a heating member, a heater holder 23 as a holder, a stay 24 as a support, a thermistor 25 as a temperature detector, a first high thermal conduction member 28, and a separation plate 41 as a separator. The fixing belt 20 is an endless belt. The pressure roller 21 is in contact with the outer circumferential surface of the fixing belt 20 to form a fixing nip N between the pressure roller 21 and the fixing belt 20. The heater 22 heats the fixing belt 20. The heater holder 23 holds the heater 22. The stay 24 supports the heater holder 23. The thermistor 25 detects the temperature of the first high thermal conduction member 28. The separation plate 41 separates the sheet P having passed through the fixing nip N from the fixing belt 20. The fixing device frame 40 holds these members inside thereof. The fixing device frame 40 is made of metal and is grounded.

The fixing belt 20, the pressure roller 21, the heater 22, the heater holder 23, the stay 24, the first high thermal conduction member 28, and the separation plate 41 extend in a direction perpendicular to the sheet surface of FIG. 2. Hereinafter, the direction is simply referred to as a longitudinal direction. Note that the longitudinal direction is also a width direction of the sheet P conveyed, a belt width direction of the fixing belt 20, and an axial direction of the pressure roller 21. A fixing rotator disposed in the fixing device is an aspect of the rotator disposed in the heating device of the present disclosure. The fixing device 9 in the present embodiment includes the fixing belt 20 as an example of the fixing rotator. A pressure rotator disposed in the fixing device is an example of an opposed rotator disposed in the heating device of the present disclosure. The fixing device 9 in the present embodiment includes the pressure roller 21 as an example of the pressure rotator.

The fixing belt 20 includes a tubular base that is made of polyimide (PI) and has an outer diameter of 25 mm and a thickness in a range of from 40 μm to 120 μm, for example. The fixing belt 20 further includes a release layer serving as an outermost surface layer. The release layer is made of fluororesin, such as tetrafluoroethylene-perfluoroalkylvinylether copolymer (PFA) and polytetrafluoroethylene (PTFE) and has a thickness in a range of from 5 μm to 50 μm to enhance durability of the fixing belt 20 and facilitate separation of the sheet P and a foreign substance from the fixing belt 20. An elastic layer made of rubber having a thickness of from 50 to 500 μm may be interposed between the base and the release layer. The base of the fixing belt 20 may be made of heat resistant resin such as polyetheretherketone (PEEK) or metal such as nickel (Ni) and steel use stainless (SUS), instead of polyimide. The inner circumferential surface of the fixing belt 20 may be coated with PI or PTFE as a slide layer.

The pressure roller 21 has an outer diameter of 25 mm, for example. The pressure roller 21 includes a core 21*a* as a first layer, an elastic layer 21*b* as a second layer layered on the core, and a surface layer 21*c* as a third layer layered on the elastic layer. The core 21*a* is a solid core metal made of a conductive material that is iron in the present embodiment. The clastic layer 21*b* is made of a non-conductive material that is silicone rubber in the present embodiment. The clastic layer 21*b* has a thickness of 3.5 mm. Forming the elastic layer 21*b* as a non-conductive layer does not need adding a material such as a filler to the elastic layer 21*b* for imparting conductivity to the elastic layer 21*b*, which is helpful to secure the elasticity and stretchability of the elastic layer 21*b*.

The pressure roller 21 is biased toward the fixing belt 20 by a biasing member and pressed against the heater 22 via the fixing belt 20. Thus, the fixing nip N is formed between the fixing belt 20 and the pressure roller 21. A driver drives and rotates the pressure roller 21 in a direction indicated by arrow in FIG. 2, and the rotation of the pressure roller 21 rotates the fixing belt 20.

The heater 22 is a planar heater extending in the longitudinal direction thereof parallel to the width direction of the fixing belt 20. The heater 22 includes a planar base 30, resistive heat generators 31 disposed on the base 30, and an insulation layer 32 covering the resistive heat generators 31. The insulation layer 32 of the heater 22 contacts the inner circumferential surface of the fixing belt 20, and the heat generated from the resistive heat generators 31 is transmitted to the fixing belt 20 through the insulation layer 32. The insulation layer 32 of the heater 22 may be in contact with the inner circumferential surface of the fixing belt 20 via a conductive member such as the thermal equalization plate. A power supply 200 (see FIG. 11) applies an alternating current (AC) voltage to the heater 22, and the resistive heat generators 31 mainly generate heat. Although the resistive heat generators 31 and the insulation layer 32 are disposed on the side of the base 30 facing the fixing belt 20 (that is, the fixing nip N) in the present embodiment, the resistive heat generators 31 and the insulation layer 32 may be disposed on the opposite side of the base 30, that is, the side facing the heater holder 23. In this case, since the heat of the resistive heat generator 31 is transmitted to the fixing belt 20 through the base 30, it is preferable that the base 30 be made of a material with high thermal conductivity such as aluminum nitride. Making the base 30 with the material having the high thermal conductivity enables to sufficiently heat the fixing belt 20 even if the resistive heat generators 31 are disposed on the side of the base 30 opposite to the side facing the fixing belt 20.

The heater holder 23 and the stay 24 are disposed inside a loop of the fixing belt 20. The stay 24 is configured by a channeled metallic member, and both side plates of the fixing device 9 support both end portions of the stay 24. Since the stay 24 supports the heater holder 23 and the heater 22, the heater 22 reliably receives a pressing force of the pressure roller 21 pressed against the fixing belt 20. Thus, the fixing nip N is stably formed between the fixing belt 20 and the pressure roller 21. In the present embodiment, the thermal conductivity of the heater holder 23 is set to be smaller than the thermal conductivity of the base 30.

When the stay 24 supports the heater holder 23, a surface of the heater holder 23 opposite the pressure roller 21 that is a left surface of the heater holder 23 in FIG. 2 contacts the stay 24 having a portion extending in the pressing direction of the pressure roller 21 (the lateral direction in FIG. 2) or a certain thick portion. Such a configuration reduces a bend of the heater holder 23 caused by the pressing force from the pressure roller 21, in particular, the bend in the longitudinal direction of the heater holder 23 in the present embodiment. However, the above-described contact includes not only the case where the stay 24 is in direct contact with the heater holder 23 but also the case where the stay 24 contacts the heater holder 23 via another member. The term "contact via another member" means a state in which another member is interposed between the stay 24 and the heater holder 23 in the lateral direction in FIG. 2, and at a position corresponding to at least a part of the member, the stay 24 contacts the member, and the member contacts the heater holder 23. The term "extending in the pressing direction" is not limited to a case where the portion of the stay 24 extends in the same direction as the pressing direction of the pressure roller 21 but includes the case where the portion of the stay 24 extends in a direction with a certain angle from the pressing direction of the pressure roller 21. Even in such cases, the stay 24 can reduce bending of the heater holder 23 under pressure from the pressure roller 21.

Since the heater holder 23 is subject to temperature increase by heat from the heater 22, the heater holder 23 is preferably made of a heat resistant material. The heater holder 23 made of heat-resistant resin having low thermal conduction, such as a liquid crystal polymer (LCP), reduces heat transfer from the heater 22 to the heater holder 23. Thus, the heater 22 can effectively heat the fixing belt 20.

In addition, the heater holder 23 includes guides 26 configured to guide the fixing belt 20. The guides 26 include upstream guides upstream from the heater 22 (that is under the heater 22 in FIG. 2) and downstream guides downstream from the heater 22 (that is over the heater 22 in FIG. 2) in a rotation direction of the fixing belt 20. The upstream guides and the downstream guides of the guides 26 are disposed at intervals in a longitudinal direction of the heater 22. Each guide 26 has a substantial fan shape and has a belt facing surface 260. The belt facing surface 260 faces the inner circumferential surface of the fixing belt 20 and is an arc-shaped or convex curved surface extending in a belt circumferential direction.

The heater holder 23 has a plurality of openings 23*a* arranged in the longitudinal direction. The openings 23*a* extend through the heater holder 23 in the thickness direction thereof. The thermistor 25 and a thermostat which is described later are disposed in the openings 23*a*. Springs 29 press the thermistor 25 and the thermostat against the back surface of the first high thermal conduction member 28. However, the first high thermal conduction member 28 (and a second high thermal conduction member described later) may have openings similar to the openings 23*a*, and the springs 29 may press the thermistor 25 and the thermostat against the back surface of the base 30.

The separation plate 41 is made of metal. For example, a metal plate made of metal such as rustproof iron, stainless steel, or aluminum is processed to make the separation plate 41. The width of the separation plate 41 in the longitudinal direction is set to be larger than the maximum width of sheet sizes permitted for use in the fixing device 9.

The first high thermal conduction member 28 is made of a material having a thermal conductivity higher than a thermal conductivity of the base 30. In the present embodiment, the first high thermal conduction member 28 is a plate made of aluminum. Alternatively, the first high thermal conduction member 28 may be made of copper, silver, graphene, or graphite, for example. The first high thermal conduction member 28 that is the plate can improve accuracy of positioning of the heater 22 with respect to the heater holder 23 and the first high thermal conduction member 28.

Next, a method of calculating the thermal conductivity is described. In order to calculate the thermal conductivity, the thermal diffusivity of a target object is firstly measured. Using the thermal diffusivity, the thermal conductivity is calculated.

The thermal diffusivity was measured using a thermal diffusivity/conductivity measuring device (trade name: AI-PHASE MOBILE 1U, manufactured by Ai-Phase co., ltd.).

In order to convert the thermal diffusivity into thermal conductivity, values of density and specific heat capacity are necessary. The density was measured by a dry automatic densitometer (trade name: ACCUPYC 1330 manufactured by Shimadzu Corporation). The specific heat capacity was measured by a differential scanning calorimeter (trade name: DSC-60 manufactured by Shimadzu Corporation), and sapphire was used as a reference material in which the specific heat capacity is known. In the present embodiment, the specific heat capacity was measured five times, and an average value was calculated and used to obtain the thermal conductivity. A temperature condition was 50° C. The thermal conductivity λ is obtained by the following expression (1).

$$\lambda = \rho \times C \times \alpha. \quad \text{Expression 1}$$

where ρ is the density, C is the specific heat capacity, and α is the thermal diffusivity obtained by the thermal diffusivity measurement described above.

When the fixing device 9 according to the present embodiment starts printing, the pressure roller 21 is driven to rotate, and the fixing belt 20 starts to be rotated. The belt facing surface 260 of the guide 26 contacts and guides the inner circumferential surface of the fixing belt 20 to rotate the fixing belt 20 stably and smoothly. As power is supplied to the resistive heat generators 31 of the heater 22, the heater 22 heats the fixing belt 20. When the temperature of the fixing belt 20 reaches a predetermined target temperature which is called a fixing temperature, as illustrated in FIG. 2, the sheet P bearing an unfixed toner image is conveyed to the fixing nip N between the fixing belt 20 and the pressure roller 21, and the unfixed toner image is heated and pressed to be fixed to the sheet P. The fixing belt 20 is a heated member heated by the heater 22.

Figure 3:
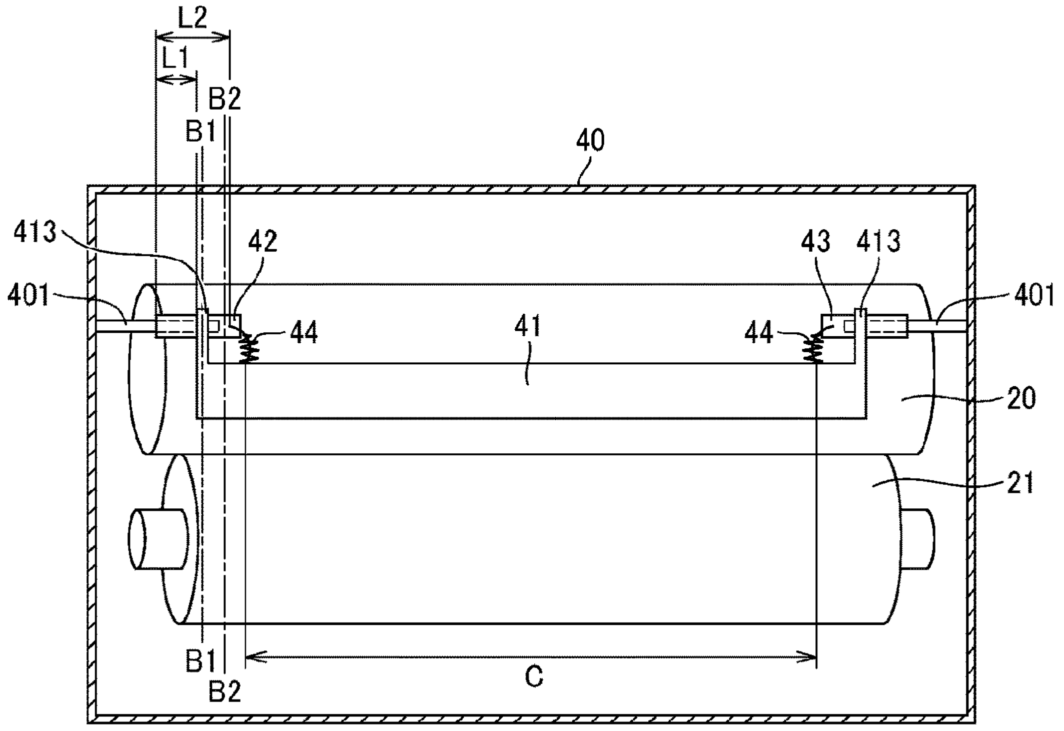
FIG. 3 is a schematic plan view of the fixing device of FIG. 2.
Figure 4:
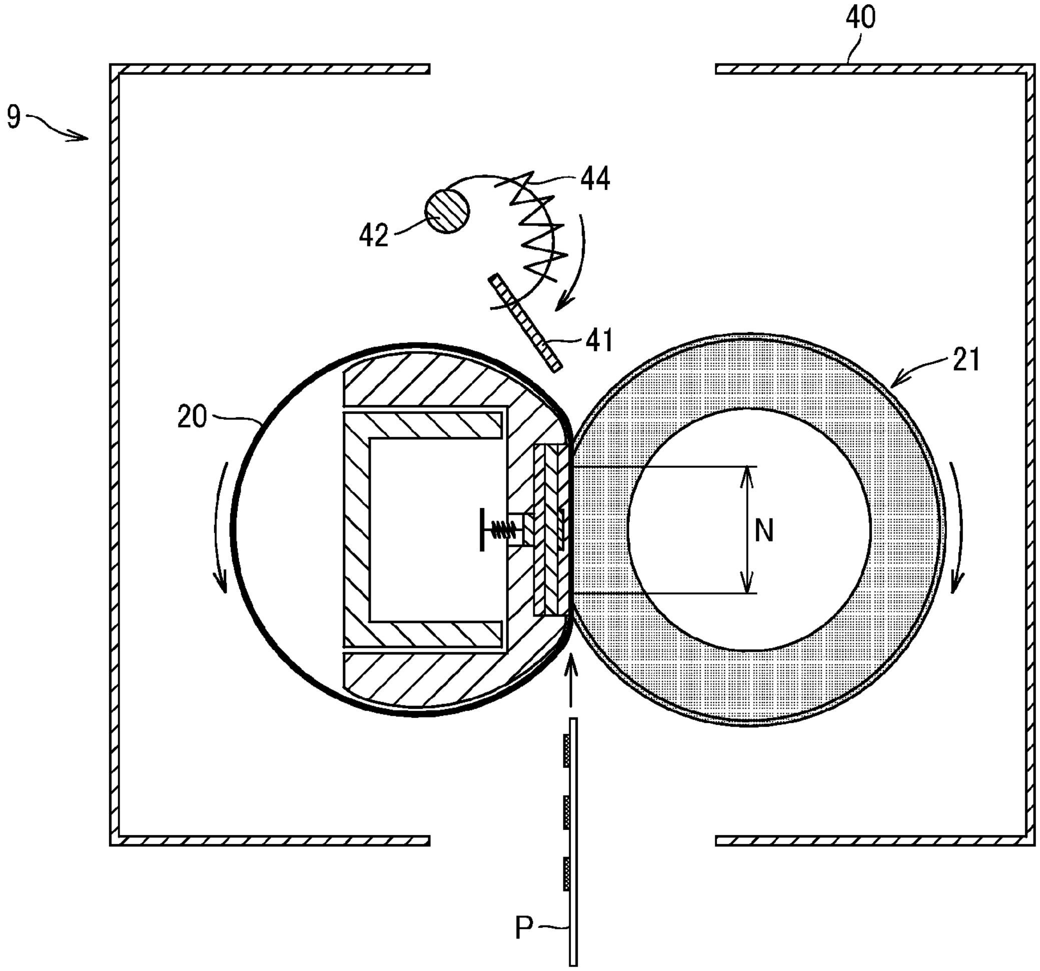
FIG. 4 is a schematic sectional view taken along line B2-B2 of FIG. 3.

With reference to FIGS. 2 to 4, the following describes the configuration of the separation plate 41 in the fixing device of the present embodiment and parts around the separation plate 41. FIG. 3 is a schematic plan view of the fixing device of the present embodiment. FIGS. 2 and 4 are sectional side views of the fixing device. FIG. 2 is the sectional side view taken along line B1-B1 in FIG. 3, and FIG. 4 is the sectional side view taken along line B2-B2 in FIG. 3.

As illustrated in FIG. 2, the separation plate 41 of the present embodiment includes a separation portion 411, abutment portions 412, and attachment portions 413. The abutment portion 412 is branched from the main body of the separation plate 41 including the separation portion 411 and abuts on the fixing belt 20 at a position downstream from the fixing nip N in the rotation direction of the fixing belt 20 and away from the fixing nip N. The attachment portion 413 is at an end of the separation plate 41 opposite to the separation portion 411.

As illustrated in FIG. 3, the attachment portions 413 are on both ends of the separation plate 41 in the longitudinal direction. The fixing device frame 40 includes a pair of holding pins 401 to hold the attachment portions 413 of the separation plate 41. A collar 42 as a resistor is assembled to one of the holding pins 401. The collar 42 covers the end of the holding pin 401. A second collar 43 made of an insulating material is assembled to the other one of the holding pins 401. As a result, the separation plate 41 is rotatably assembled into the fixing device frame 40 via the collar 42 and the second collar 43.

As illustrated in FIG. 2, the attachment portion 413 is fitted into the collar 42 so as to cover the outer peripheral surface of the collar 42. That is, the separation plate 41 is attached to the holding pin 401 of the fixing device frame 40 via the collar 42. The separation plate 41 is rotatably provided with respect to the collar 42 and the holding pin 401.

The collar 42 is made of a conductive resin and has a volume resistance of 100 kΩ or more. The above-described volume resistance can limit a current passing through the collar 42 in the image forming apparatus using the power supply voltage of 100 v to be 1.0 mA or less that is defined in Appended table 12 of Electrical Appliance and Material Safety Act regarding Article 7 (ii) of Ministerial Order to Provide Technical Standards for Electrical Appliances and Materials in Japan. The value of the above-described volume resistance of the collar 42 is obtained as follows. A voltage of 100 v is applied between the surface of the collar 42 and an exposed portion of the holding pin 401, and after 10 seconds has passed, a current flowing between the surface of the collar 42 and an exposed portion of the holding pin 401 is measured. Calculation using the measured current and the voltage of 100 v gives the value of the above-described volume resistance.

As illustrated in FIG. 4, one end of a torsion spring 44 as a biasing member is attached to the collar 42. In other words, the torsion spring 44 is attached to the holding pin 401 of the fixing device frame 40 via the collar 42. The other end of the torsion spring 44 opposite to the one end attached to the collar 42 is fixed to the separation plate 41. The torsion spring 44 forces the separation plate 41 to move toward the fixing belt 20 in a direction indicated by an arrow in FIG. 4. As a result, the abutment portion 412 of the separation plate 41 illustrated in FIG. 2 comes into contact with the outer circumferential surface of the fixing belt 20.

In order for the separation plate 41 to reliably separate the sheet P from the fixing belt 20, the distal end of the separation plate 41 is at a position closer to the downstream end of the fixing nip N in the sheet conveyance direction. Since the separation plate 41 made of metal in the present embodiment has high dimensional accuracy, the distal end of the separation plate 41 can be brought closer to the downstream end of the fixing nip N in the sheet conveyance direction.

Figure 5B:
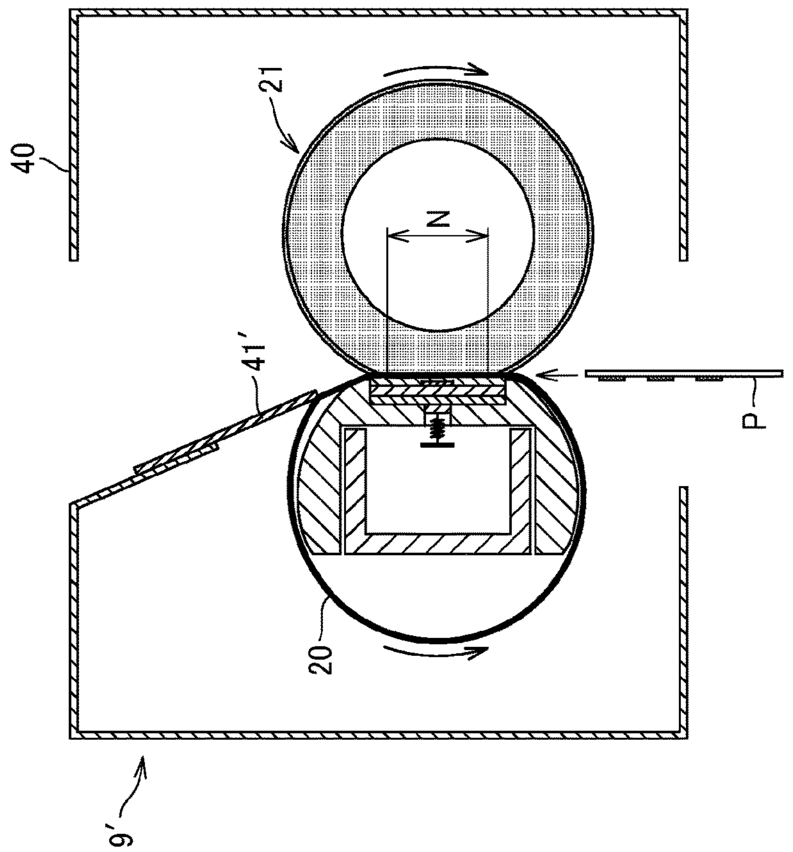
FIG. 5B is a schematic sectional view of the fixing device of FIG. 5A in which deformation occur in the fixing belt.
Figure 5A:
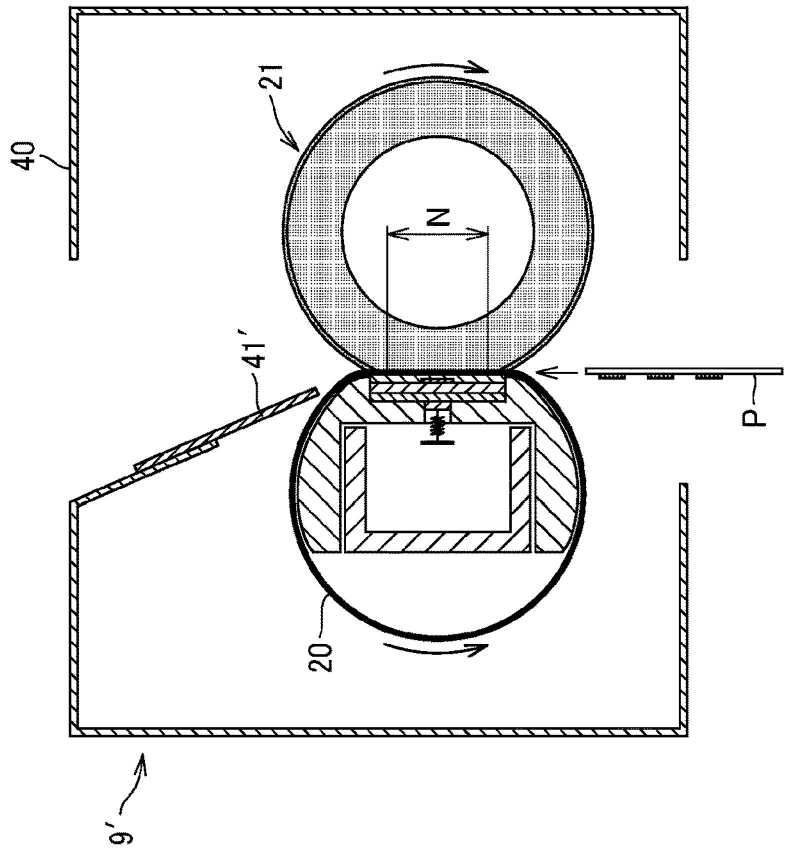
FIG. 5A is a schematic sectional view of a fixing device different from the fixing device according to the embodiment.

However, the distal end of the separation plate 41 close to the fixing nip N may come into contact with the fixing belt 20. For example, as illustrated in FIG. 5A, a fixing device 9' that is different from the present embodiment includes a separation plate 41' close to the downstream end of the fixing nip N in the sheet conveyance direction. After the heater 22 heats the fixing belt 20 and the sheet passes through the fixing nip N, the heater 22 stops heating the fixing belt 20, and the fixing belt 20 is left as it is, which causes deformation of the fixing belt 20 in the fixing nip N as illustrated in FIG. 5B. The deformation is caused by a difference in cooling rate between a portion of the fixing belt 20 in the fixing nip N and another portion of fixing belt 20. In addition, the pressure applied to the fixing belt 20 by the pressure roller 21 accelerates the deformation. The deformation of the fixing belt 20 causes the distal end of the separation plate 41' to come into contact with the fixing belt 20, causing wear or damage to the surface layer of the fixing belt 20 and adhesion of toner or paper dust to the distal end of the separation plate 41'.

Figure 6:
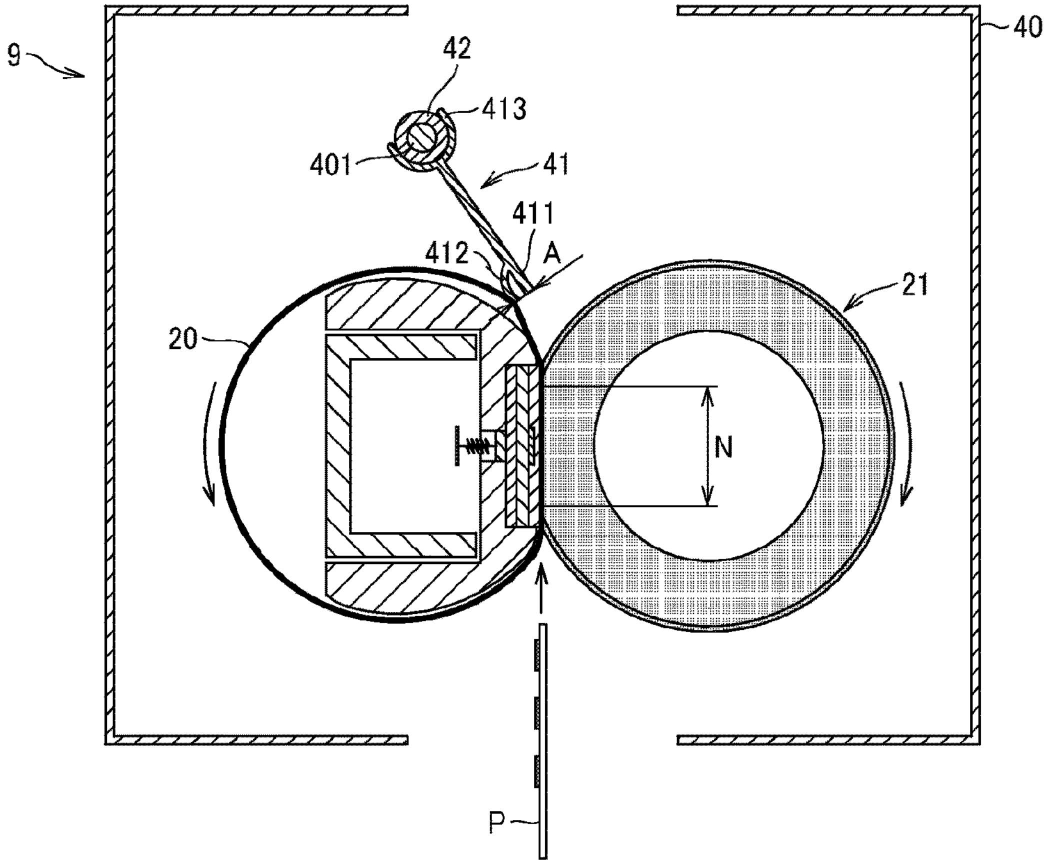
FIG. 6 is a schematic sectional view of the fixing device according to the embodiment in which the deformation occurs in the fixing belt.

In contrast, the separation plate 41 of the fixing device 9 according to the present embodiment includes the abutment portion 412 that follows the deformation of the fixing belt 20 and changes the position of the separation plate 41 as illustrated in FIG. 6. In other words, the abutment portion 412 continues to be in contact with the fixing belt 20 at the predetermined position. As a result, the abutment portion 412 maintains a constant gap A between the distal end of the separation portion 411 and the outer circumferential surface of the fixing belt 20 and prevents the distal end of the separation portion 411 from coming into contact with the fixing belt 20. Therefore, the fixing device 9 according to the present embodiment can prevent the surface layer of the fixing belt 20 from being worn or damaged and prevent the toner and paper dust from adhering to the distal end of the separation plate 41. Since the torsion spring 44 urges the separation plate 41 toward the fixing belt 20, the abutment portion 412 stably contacts the outer circumferential surface of the fixing belt 20.

However, the above-described configuration including the conductive separation plate 41 in contact with the fixing belt 20 may cause the following disadvantages. The separation plate 41 is likely to pass a current from the heater 22 to the fixing device frame 40, thereby causing a variation in the amount of heat generated by the heater 22, adverse effects on electronic components in the image forming apparatus. The current may charge a part in the image forming apparatus, thereby causing toner adhesion to the part. The part contaminated by the toner contaminates an operator's hand operating an operation such as removing a jammed sheet.

Figure 7:
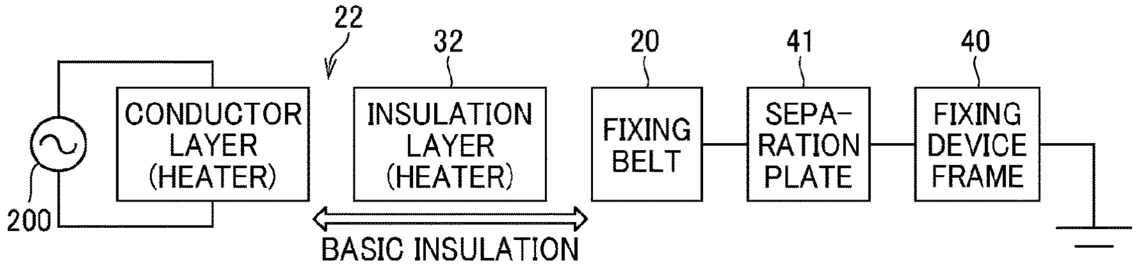
FIG. 7 is a diagram illustrating a conductive path in the fixing device different from the fixing device according to the embodiment.

The following describes a conductive path from the heater 22 to the fixing device frame 40 with reference to FIG. 7. FIG. 7 illustrates the conductive path not including the above-described collar 42 between the fixing device frame 40 and the separation plate 41.

As illustrated in FIG. 7, the insulation layer 32 thinner than 0.1 mm basically insulates the fixing belt 20 from a conductor layer of the heater 22 to which the AC voltage is applied. In the above-described configuration, damage of the thin insulation layer 32 electrically connects the heater 22 to the fixing belt 20, and the current flows from the heater 22 to the fixing device frame 40 via the fixing belt 20 and the separation plate 41. As a result, the above-described disadvantages occur. In contrast, for example, a halogen heater as the heater used in the fixing device includes a filament that flows current, the filament is covered with a glass tube as the insulation layer. The thickness of wall of the glass tube is 0.4 mm or more enhances insulation between the halogen heater and the fixing belt 20. In addition, the halogen heater and the fixing belt 20 are not in contact with each other. Accordingly, the halogen heater is less likely to cause the above-described disadvantages.

Figure 8:
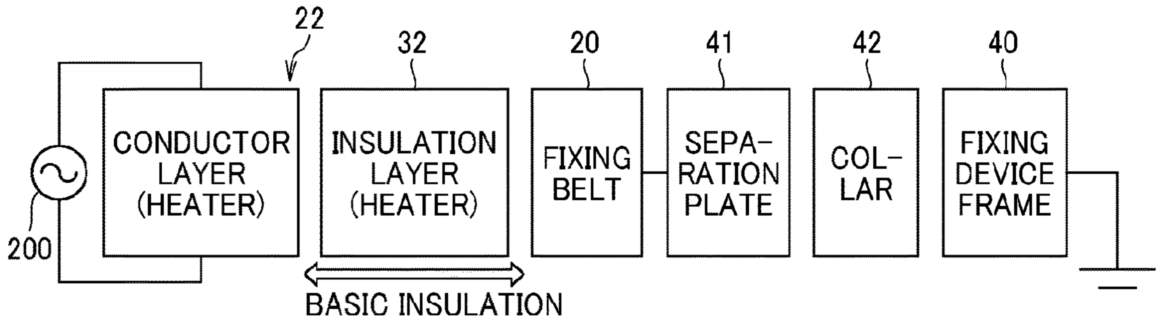
FIG. 8 is a diagram illustrating a conductive path in the fixing device according to the embodiment.

In contrast, as illustrated in FIG. 8, the fixing device according to the present embodiment includes the collar 42 between the separation plate 41 and the fixing device frame 40. The collar 42 can secure a certain degree of insulation between the separation plate 41 and the fixing device frame 40. In addition, the collar 42 disposed between the torsion spring 44 and the fixing device frame 40 can secure the certain degree of insulation between the torsion spring 44 and the fixing device frame 40. The above-described configuration can reduce the current flowing from the heater 22 to the fixing device frame 40 via the fixing belt 20 and the separation plate 41 or via the fixing belt 20, the separation plate 41, and the torsion spring 44. As a result, the above-described configuration can prevent the variation in the amount of heat generated by the heater 22, the adverse effects on electronic components in the image forming apparatus, the contamination of part in the image forming apparatus, and the like. In addition, the collar 42 having the certain degree of insulation can prevent electric charge from being accumulated in the separation plate 41. An amount of electric charge accumulated in the separation plate 41 attached by the collar 42 is smaller than an amount of electric charge accumulated in the separation plate attached by the collar made of insulation material. In particular, the collar 42 having the volume resistance equal to or greater than 100 kΩ can prevent the charge accumulation in the separation plate 41 in addition to limiting the current flowing from the separation plate 41 or the torsion spring 44 to the fixing device frame 40 to prevent the above-described disadvantages.

In addition, the separation plate 41 and the fixing device frame 40 are preferably designed to satisfy a creepage distance and an air clearance corresponding to basic insulation, and the torsion spring 44 and the fixing device frame 40 is preferably designed to satisfy the creepage distance and the air clearance corresponding to the basic insulation. Specifically, the creepage distance is preferably 2.5 mm or more, and the air clearance is preferably 2.2 mm or more. In the present embodiment, the creepage distance and the air clearance between the separation plate 41 and the fixing device frame 40 is a distance from the attachment portion 413 of the separation plate 41 to the exposed portion of the holding pin 401 of the fixing device frame 40, that is, the distance L1 in FIG. 3 plus the thickness of the collar 42. The creepage distance and the air clearance between the torsion spring 44 and the fixing device frame 40 is a distance from a point at which the torsion spring 44 is attached to the collar 42 to the exposed portion of the holding pin 401, that is, the distance L2 in FIG. 3 plus the thickness of the collar 42. Setting these distances to 2.5 mm or more secures the insulation between the separation plate 41 and the fixing device frame 40 and the insulation between the torsion spring 44 and the fixing device frame 40 to be equivalent to the basic insulation. The above-described thickness of the collar 42 is a distance L3 in FIG. 2, that is, the radial distance from the inner circumferential surface of the collar 42 to the outer circumferential surface of the collar 42 in the radial direction of the collar 42. However, strictly speaking, the above-described thickness of the collar 42 is not a distance in the cross section of FIG. 2. The above-described thickness of the collar 42 is a length of the left side of the collar 42 in FIG. 3 (that is indicated by a left leader line of the distance L1 and the distance L2 in FIG. 3) and the length corresponding to the distance L3.

The abutment portions 412 of the separation plate 41 in the present embodiment are in contact with the fixing belt 20 at positions outside a sheet passing region C in the width direction of the sheet. Specifically, the abutment portions 412 are disposed near both ends of the separation plate 41. One of the abutment portions is in contact with the fixing belt 20 at a position on a line B1-B1 in FIG. 3 as illustrated in FIG. 2 that is the schematic sectional view of the fixing device taken along the line B1-B1. The other one of the abutment portions is in contact with the fixing belt 20 at a position similar to the position on the line B1-B1 on the other end of the separation plate 41. These positions are outside the sheet passing region C illustrated in FIG. 3 in the longitudinal direction. Instead of the above-described abutment portions 412, only one abutment portion 412 may be disposed near the one end of the separation plate 41 in the longitudinal direction. The size and number of the abutment portion 412 may be appropriately adjusted. Setting the abutment portion 412 at the position outside the sheet passing region enables preventing abrasion of the fixing belt 20 in the sheet passing region and adhesion of toner and paper dust to the abutment portion 412. The sheet passing region C means a region through which the recording medium passes. The above-described sheet passing region in the present embodiment means a region through which the sheet having the largest width in the sheets that is permitted for use in the fixing device 9. The width direction of the sheet is the lateral direction in FIG. 3, is orthogonal to the sheet conveyance direction, and is along the surface of the sheet.

Figure 9:
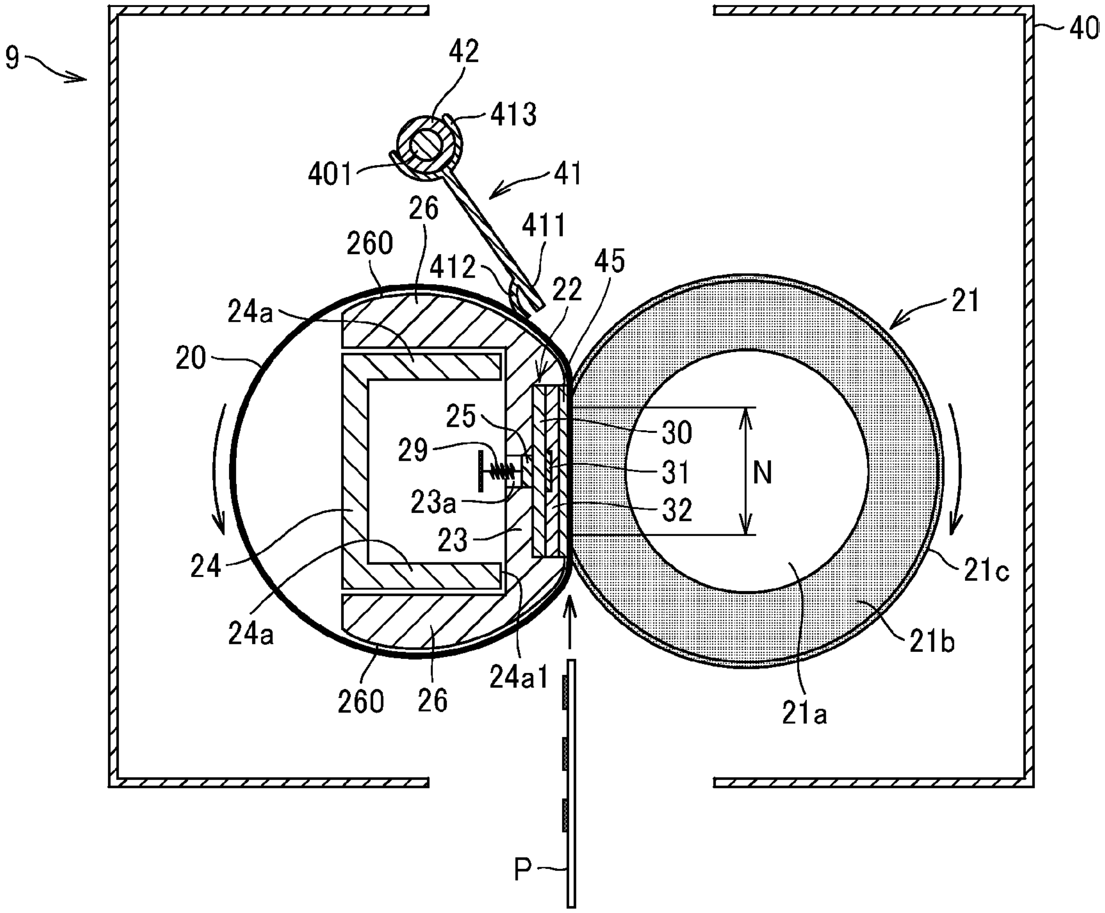
FIG. 9 is a schematic sectional side view of the fixing device including a thermal equalization plate.

As illustrated in FIG. 9, the above-described configuration including the fixing device frame 40, the separation plate 41, the collar 42, the torsion spring 44, and the like can be similarly applied to a fixing device including a thermal equalization plate 45 between the heater 22 and the inner circumferential surface of the fixing belt 20. The thermal equalization plate 45 is made of the conductive material such as aluminum or copper. The above-described fixing device also can secure the certain degree of insulation between the separation plate 41 and the fixing device frame 40 and between the torsion spring 44 and the fixing device frame 40.

Figure 10:
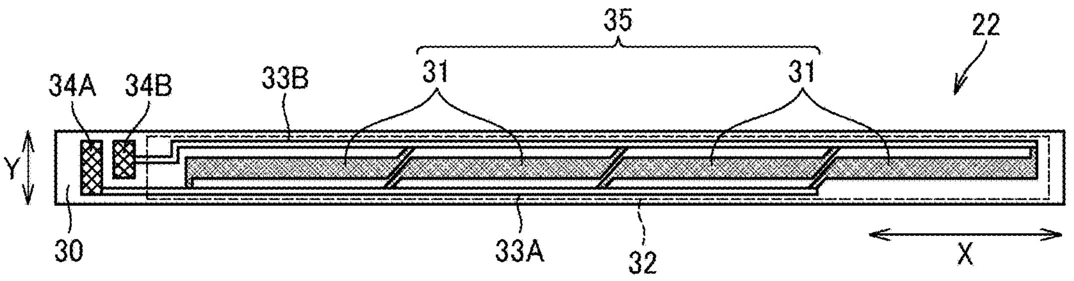
FIG. 10 is a plan view of a heater.

FIG. 10 is a plan view of the heater according to the present embodiment.

As illustrated in FIG. 10, the heater 22 includes the planar base 30. On the surface of the base 30, a plurality of resistive heat generators 31 (four resistive heat generators 31), power supply lines 33A and 33B that are conductors, a first electrode 34A, and a second electrode 34B are disposed. However, the number of resistive heat generators 31 is not limited to four in the present embodiment.

In the present embodiment, the longitudinal direction of the heater 22 and the like (that is the direction perpendicular to the surface of the paper on which FIG. 2 is drawn) is also an arrangement direction X in which the plurality of resistive heat generators 31 are arranged as illustrated in FIG. 10. Hereinafter, the direction X is also simply referred to as the arrangement direction. In addition, a direction that intersects the arrangement direction of the plurality of resistive heat generators 31 and is different from a thickness direction of the base 30 is referred to as a direction intersecting the arrangement direction. In the present embodiment, the direction intersecting the arrangement direction is the vertical direction Y in FIG. 10. The direction Y intersecting the arrangement direction is a direction along the surface of the base 30 on which the resistive heat generators 31 are arranged and is also a short-side direction of the heater 22 and a conveyance direction of the sheet P passing through the fixing device 9.

The plurality of resistive heat generators 31 configure a plurality of heat generation portions 35 divided in the arrangement direction. The resistive heat generators 31 are electrically coupled in parallel to a pair of electrodes 34A and 34B disposed on one end of the base 30 in the arrangement direction (that is a left end of the base 30 in FIG. 10) via the power supply lines 33A and 33B. The power supply lines 33A and 33B are made of conductors having an electrical resistance value smaller than an electrical resistance value of the resistive heat generator 31. A gap area between neighboring resistive heat generators 31 is preferably 0.2 mm or more, more preferably 0.4 mm or more from the viewpoint of maintaining the insulation between the neighboring resistive heat generators 31.

If the gap area between the neighboring resistive heat generators 31 is too large, the gap area is likely to cause temperature decrease in the gap area. Accordingly, from the viewpoint of reducing the temperature unevenness in the arrangement direction, the gap area is preferably equal to or shorter than 5 mm, and more preferably equal to or shorter than 1 mm.

The resistive heat generator 31 is made of a material having a positive temperature coefficient (PTC) of resistance that is a characteristic that the resistance value increases (the heater output decreases) as the temperature T increases. In the present embodiment, the temperature coefficient resistance of the resistive heat generator 31 is 500 ppm.

Dividing the heat generation portion 35 configured by the resistive heat generators 31 having the PTC characteristic in the arrangement direction prevents overheating of the fixing belt 20 when small sheets pass through the fixing device 9. When the small sheets each having a width smaller than the entire width of the heat generation portion 35 pass through the fixing device 9, the temperature of a region of the resistive heat generator 31 corresponding to a region of the fixing belt 20 outside the small sheet increases because the small sheet does not absorb heat of the fixing belt 20 in the region outside the small sheet that is the region outside the width of the small sheet. Since a constant voltage is applied to the resistive heat generators 31, the increase in resistance values of the resistive heat generators 31 caused by the temperature increase in the regions outside the width of the small sheets relatively reduces outputs (heat generation amounts) of the resistive heat generators 31 in the regions, thus restraining an increase in temperature in the regions that are end portions of the fixing belt outside the small sheets. Electrically coupling the plurality of resistive heat generators 31 in parallel can restrain temperature rises in non-sheet passing regions while maintaining the print speed. The heat generator that configures the heat generation portion 35 may not be the resistive heat generator having the PTC characteristic. The resistive heat generators in the heater 22 may be arranged in a plurality of rows arranged in the direction intersecting the arrangement direction.

The resistive heat generators 31 are produced, for example, as below. Silver-palladium (AgPd), glass powder, and the like are mixed to make paste. The paste is coated to the base 30 by screen printing or the like. Thereafter, the base 30 is subject to firing. Then, the resistive heat generators 31 are produced. The resistive heat generators 31 each have a resistance value of 80Ω at room temperature, in the present embodiment. The material of the resistive heat generators 31 may contain a resistance material, such as silver alloy (AgPt) or ruthenium oxide (RuO2), other than the above material. Silver (Ag), AgPd or the like may be used as a material of the power supply lines 33A and 33B and the electrodes 34A and 34B. Screen-printing such a material forms the power supply lines 33A and 33B and the electrodes 34A and 34B. The power supply lines 33A and 33B are made of conductors having the electrical resistance value smaller than the electrical resistance value of the resistive heat generators 31.

The material of the base 30 is preferably a nonmetallic material having excellent thermal resistance and insulating properties, such as glass, mica, or ceramic such as alumina or aluminum nitride. The heater 22 according to the present embodiment includes an alumina base having a thickness of 1.0 mm, a width of 270 mm in the arrangement direction, and a width of 8 mm in the direction intersecting the arrangement direction. The base 30 may be made by layering the insulation material on conductive material such as metal. Low-cost aluminum or stainless steel is favorable as the metal material of the base 30. The base 30 made of a stainless steel plate is resistant to cracking due to thermal stress. To improve thermal uniformity of the heater 22 and image quality, the base 30 may be made of a material having high thermal conductivity, such as copper, graphite, or graphene.

The insulation layer 32 may be, for example, a thermal resistance glass having a thickness of 75 μm. The insulation layer 32 covers, insulates, and protects the resistive heat generators 31 and the power supply lines 33A and 33B, and additionally retains slidability with the fixing belt 20.

Figure 11:
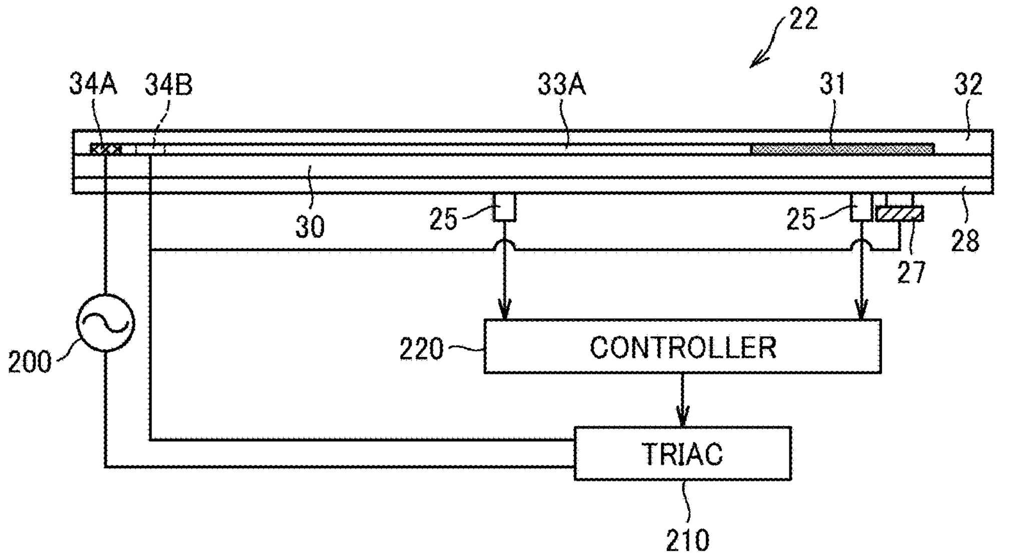
FIG. 11 is a schematic diagram illustrating a circuit to supply power to the heater.

FIG. 11 is a schematic diagram illustrating a circuit to supply power to the heater according to the present embodiment.

As illustrated in FIG. 11, the alternating current power supply 200 is electrically coupled to the electrodes 34A and 34B of the heater 22 to configure a power supply circuit in the present embodiment to supply power to the resistive heat generators 31. The power supply circuit includes a triac 210 that controls an amount of power supplied. A controller 220 controls the amount of power supplied to the resistive heat generators 31 via the triac 210 based on temperatures detected by the thermistors 25. The controller 220 includes a microcomputer including, for example, a central processing unit (CPU), a read only memory (ROM), a random access memory (RAM), and an input and output (I/O) interface.

In the present embodiment, one thermistor 25 is disposed in the central region of the heater 22 in the arrangement direction that is the region inside a sheet conveyance span for the smallest sheet, and the other thermistor 25 is disposed in one end portion of the heater 22 in the arrangement direction. A thermostat 27 as a power cut-off device is disposed in the one end portion of the heater 22 in the arrangement direction and cuts off power supply to the resistive heat generators 31 when the temperature of the resistive heat generator 31 becomes a predetermined temperature or higher. The thermistors 25 and the thermostat 27 contact the first high thermal conduction member 28 to detect the temperature of the first high thermal conduction member 28.

Figure 12:
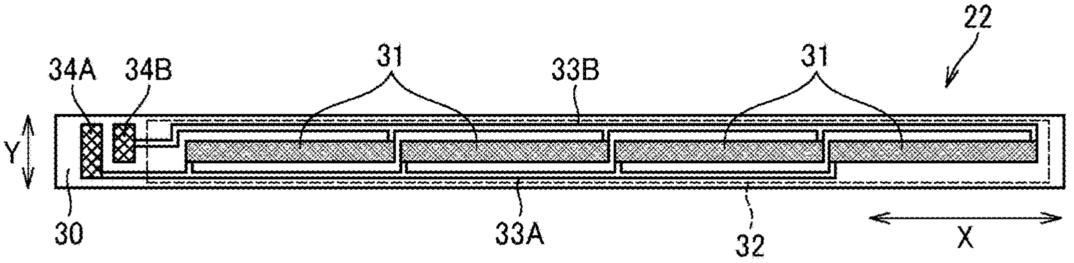
FIG. 12 is a plan view of a heater including resistive heat generators each having a form different from a form of the resistive heat generator illustrated in FIG. 10.
Figure 13:
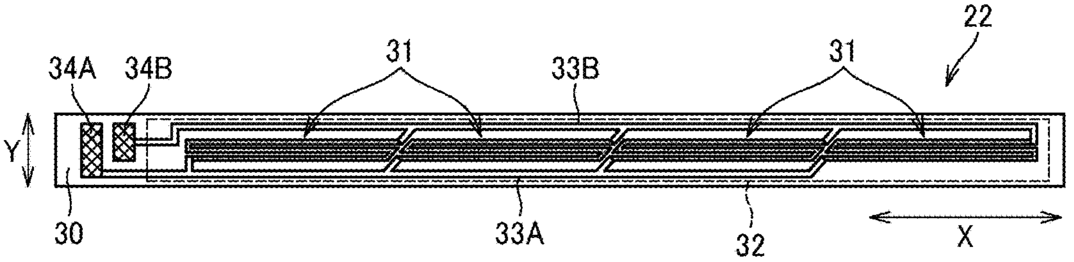
FIG. 13 is a plan view of a heater including resistive heat generators each having a form different from each of the forms of the resistive heat generators illustrated in FIGS. 10 and 12.

The first electrode 34A and the second electrode 34B are disposed on the same end portion of the base 30 in the arrangement direction in the present embodiment but may be disposed on both end portions of the base 30 in the arrangement direction. The shape of resistive heat generator 31 is not limited to the shape in the present embodiment. For example, as illustrated in FIG. 12, the shape of resistive heat generator 31 may be a rectangular shape, or as illustrated in FIG. 13, the resistive heat generator 31 may be configured by a linear portion folding back to form a substantially parallelogram shape. In addition, as illustrated in FIG. 12, portions each extending from the resistive heat generator 31 having a rectangular shape to one of the power supply lines 33A and 33B (the portion extending in the direction intersecting the arrangement direction) may be a part of the resistive heat generator 31 or may be made of the same material as the power supply lines 33A and 33B.

Figure 14A:
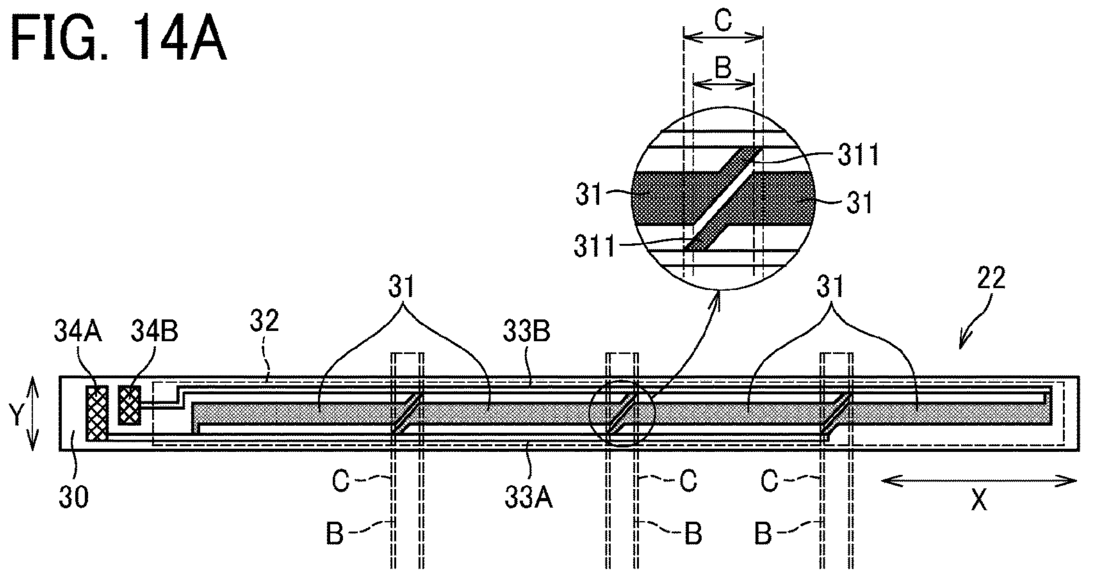
FIG. 14A is a plan view of the heater including the resistive heat generators of FIG. 10.
Figure 14B:
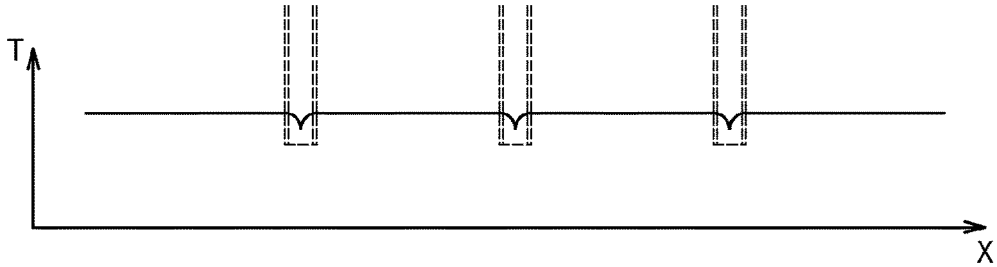
FIG. 14B is a graph illustrating a temperature distribution of the fixing belt in an arrangement direction of the resistive heat generators of the heater of FIG. 10.

FIG. 14A is a plan view of the heater including the resistive heat generators of FIG. 10. FIG. 14B is a graph illustrating a temperature distribution of the fixing belt in the arrangement direction of the resistive heat generators. FIG. 14A illustrates the arrangement of the resistive heat generators 31 of the heater 22. In the graph of FIG. 14B, a vertical axis represents the temperature T of the fixing belt 20, and a horizontal axis represents the position of the fixing belt 20 in the arrangement direction.

As illustrated in FIG. 14A, the plurality of resistive heat generators 31 of the heater 22 are separated from each other in the arrangement direction to form separation areas B including gap areas between the neighboring resistive heat generators 31.

In other words, the heater 22 has gap areas between the plurality of resistive heat generators 31. As illustrated in an enlarged view of FIG. 14A, the separation area B includes the entire gap area sandwiched by the adjoining resistive heat generators 31. In addition, the separation area B includes parts of the resistive heat generators sandwiched between lines extending in a direction orthogonal to the arrangement direction from both ends of the gap area in the arrangement direction of the resistive heat generators 31. The area occupied by the resistive heat generators 31 in the separation area B is smaller than the area occupied by the resistive heat generators 31 in another area of the heat generation portion 35, and the amount of heat generated in the separation area B is smaller than the amount of heat generated in another area of the heat generation portion. As a result, the temperature of the fixing belt 20 on the separation area B becomes smaller than the temperature of the fixing belt 20 on another area, which causes temperature unevenness in the arrangement direction of the fixing belt 20 as illustrated in FIG. 14B. Similarly, the temperature of the heater 22 corresponding to the separation area B becomes smaller than the temperature of the heater 22 corresponding to another area of the heat generation portion 35. In addition to the separation area B, the heater 22 has an enlarged separation area C including areas corresponding to connection portions 311 of the resistive heat generators 31 and the separation area B as illustrated in the enlarged view of FIG. 14A. The connection portion 311 is defined as a portion of the resistive heat generator 31 that extends in the direction intersecting the arrangement direction and is connected to one of the power supply lines 33A and 33B. Similar to the separation area B, the temperature of the heater 22 corresponding to the enlarged separation area C and the temperature of the fixing belt 20 corresponding to the enlarged separation area C are smaller than the temperatures of the heater 22 and the fixing belt 20 corresponding to another area of the heat generation portion 35.

Figure 15:
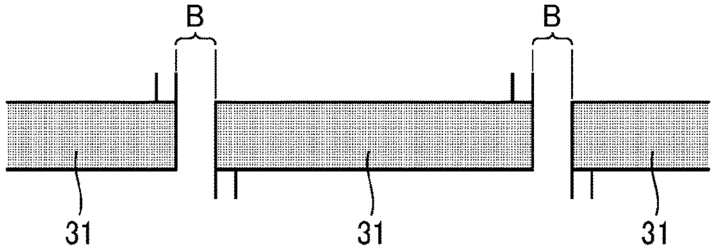
FIG. 15 is a diagram illustrating separation areas of the heater of FIG. 12.
Figure 16:
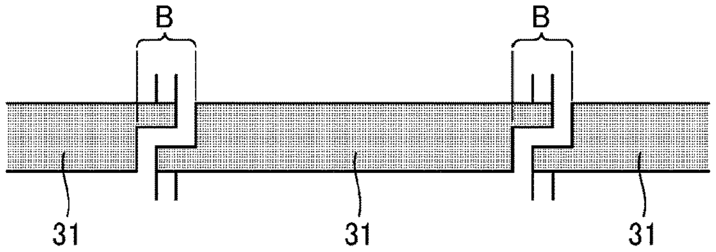
FIG. 16 is a diagram illustrating separation areas each having a form different from the form of the separation area of FIG. 15.
Figure 17:
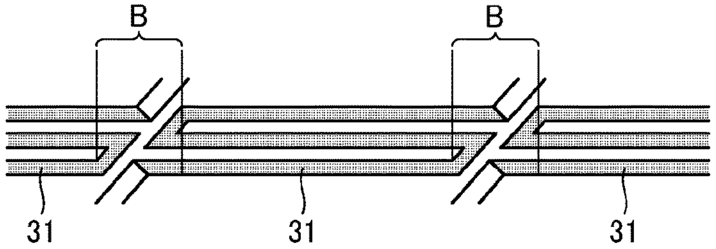
FIG. 17 is a diagram illustrating separation areas of the heater of FIG. 13.

As illustrated in FIG. 15, the heater 22 including the rectangular resistive heat generators 31 illustrated in FIG. 12 also has the separation areas B having lower temperatures than another area of the heat generation portion 35. In addition, the heater 22 including the resistive heat generators 31 having forms as illustrated in FIG. 16 has the separation areas B with lower temperatures than another area of the heat generation portion 35. As illustrated in FIG. 17, the heater 22 including the resistive heat generators 31 having forms as illustrated in FIG. 13 has the separation areas B with lower temperatures than another area of the heat generation portion 35. However, overlapping the resistive heat generators 31 lying next to each other in the arrangement direction as illustrated in FIGS. 14, 16, and 17 can reduce the above-described temperature drop that the temperature of the fixing belt 20 corresponding to the separation area B is smaller than the temperature of the fixing belt 20 corresponding to an area other than the separation area B.

The fixing device 9 in the present embodiment includes the first high thermal conduction member 28 described above in order to reduce the temperature drop corresponding to the separation area B as described above and reduce the temperature unevenness in the arrangement direction of the fixing belt 20. Next, a detailed description is given of the first high thermal conduction member 28.

As illustrated in FIG. 2, the first high thermal conduction member 28 is disposed between the heater 22 and the stay 24 in the lateral direction of FIG. 2 and is particularly sandwiched between the heater 22 and the heater holder 23. One side of the first high thermal conduction member 28 is brought into contact with the back surface of the base 30, and the other side of the first high thermal conduction member 28 is brought into contact with the heater holder 23.

The stay 24 has two rectangular portions **24*a* extending in a thickness direction of the heater 22 and each having a contact surface 24*al* that contacts the back side of the heater holder 23 to support the heater holder 23, the first high thermal conduction member 28, and the heater 22. In the direction intersecting the arrangement direction that is the vertical direction in FIG. 2, the contact surfaces 24*al* are outside the resistive heat generators 31. The above-described structure prevents heat transfer from the heater 22 to the stay 24 and enables the heater 22 to effectively heat the fixing belt 20**.

Figure 18:
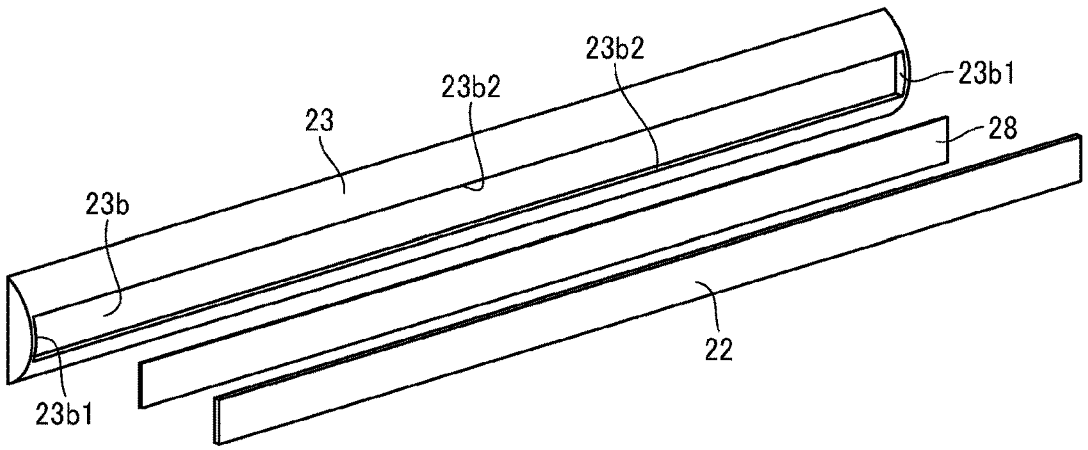
FIG. 18 is a perspective view of the heater, a first high thermal conduction member, and a heater holder.

As illustrated in FIG. 18, the first high thermal conduction member 28 is a plate having a thickness of 0.3 mm, a length of 222 mm in the arrangement direction, and a width of 10 mm in the direction intersecting the arrangement direction. In the present embodiment, the first high thermal conduction member 28 is made of a single plate but may be made of a plurality of members.

In FIG. 18, the guide 26 in FIG. 2 is omitted.

The first high thermal conduction member 28 is fitted into a recessed portion **23*b* of the heater holder 23, and the heater 22 is mounted thereon. Thus, the first high thermal conduction member 28 is sandwiched and held between the heater holder 23 and the heater 22. In the present embodiment, the length of the first high thermal conduction member 28 in the arrangement direction is substantially the same as the length of the heater 22 in the arrangement direction. Both side walls 23*b*1 forming the recessed portion 23*b* in the arrangement direction restrict movement of the heater 22 and movement of the first high thermal conduction member 28 in the arrangement direction and work as arrangement direction regulators. Reducing the positional deviation of the first high thermal conduction member 28 in the arrangement direction in the fixing device 9 improves the thermal conductivity efficiency with respect to a target range in the arrangement direction. In addition, both side walls 23*b*2 forming the recessed portion 23*b* in the direction intersecting the arrangement direction restricts movement of the heater 22 and movement of the first high thermal conduction member 28** in the direction intersecting the arrangement direction.

Figure 19:
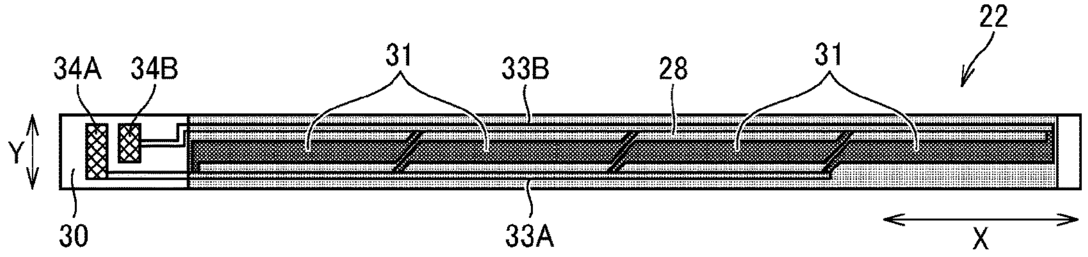
FIG. 19 is a plan view of the heater to illustrate a setting of the first high thermal conduction member.
Figure 20:
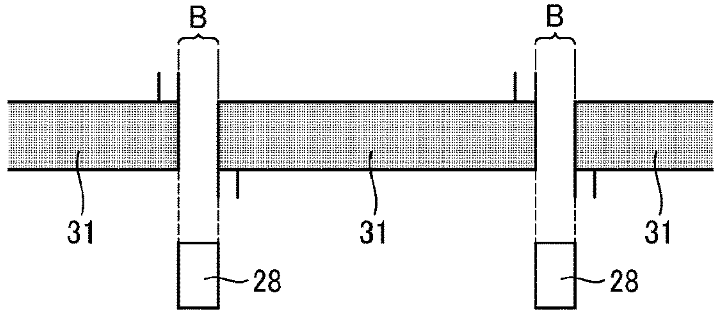
FIG. 20 is a schematic diagram illustrating another example of the setting of the first high thermal conduction members in the heater.

The range in which the first high thermal conduction member 28 is disposed in the arrangement direction is not limited to the above. For example, as illustrated in FIG. 19, the first high thermal conduction member 28 may be disposed so as to face a range corresponding to the heat generation portion 35 in the arrangement direction (see a hatched portion in FIG. 19). As illustrated in FIG. 20, the first high thermal conduction member 28 may face the entire gap area between the resistive heat generators 31. In FIG. 20, for the sake of convenience, the resistive heat generator 31 and the first high thermal conduction member 28 are shifted in the vertical direction of FIG. 20 but are disposed at substantially the same position in the direction intersecting the arrangement direction. However, the present disclosure is not limited to the above. The first high thermal conduction member 28 may be disposed to face a part of the resistive heat generators 31 in the direction intersecting the arrangement direction or may be disposed so as to cover the entire resistive heat generators 31 in the direction intersecting the arrangement direction as illustrated in FIG. 21, which is described below.

Figure 21:
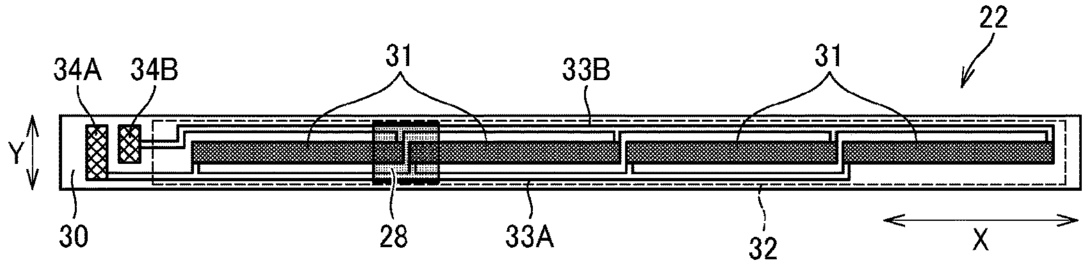
FIG. 21 is a plan view of the heater having a further different setting of the first high thermal conduction member.

As illustrated in FIG. 21, the first high thermal conduction member 28 may be face a part of each of the neighboring resistive heat generators 31 in addition to the gap area between the neighboring resistive heat generators 31. The first high thermal conduction member 28 may be disposed to face all separation areas B in the heater 22, one separation area B as illustrated in FIG. 21, or some of separation areas B. At least a part of the first high thermal conduction member 28 may be disposed to face the separation area B.

Due to the pressing force of the pressure roller 21, the first high thermal conduction member 28 is sandwiched between the heater 22 and the heater holder 23 and is brought into close contact with the heater 22 and the heater holder 23. Bringing the first high thermal conduction member 28 into contact with the heaters 22 improves the heat conduction efficiency of the heaters 22 in the arrangement direction. The first high thermal conduction member 28 facing the separation area B improves the heat conduction efficiency of a part of the heater 22 facing the separation area B in the arrangement direction, transmits heat to the part of the heater 22 facing the separation area B, and raises the temperature of the part of the heater 22 facing the separation area B. As a result, the first high thermal conduction member 28 reduces the temperature unevenness in the arrangement direction of the heaters 22. Thus, temperature unevenness in the arrangement direction of the fixing belt 20 is reduced. Therefore, the above-described structure prevents fixing unevenness and gloss unevenness in the image fixed on the sheet. Since the heater 22 does not need to generate additional heat to secure sufficient fixing performance in the part of the heater 22 facing the separation area B, energy consumption of the fixing device 9 can be saved. The first high thermal conduction member 28 disposed over the entire area of the heat generation portion 35 in the arrangement direction improves the heat transfer efficiency of the heater 22 over the entire area of a main heating region of the heater 22 (that is, an area facing an image formation area of the sheet passing through the fixing device) and reduces the temperature unevenness of the heater 22 and the temperature unevenness of the fixing belt 20 in the arrangement direction.

In the present embodiment, the combination of the first high thermal conduction member 28 and the resistive heat generator 31 having the PTC characteristic described above efficiently prevents overheating the non-sheet passing region (that is the region of the fixing belt outside the small sheet) of the fixing belt 20 when small sheets pass through the fixing device 9. Specifically, the PTC characteristic reduces the amount of heat generated by the resistive heat generator 31 in the non-sheet passing region, and the first high thermal conduction member effectively transfers heat from the non-sheet passing region in which the temperature rises to a sheet passing region that is a region of the fixing belt contacting the sheet. As a result, the overheating of the non-sheet passing region is effectively prevented.

The first high thermal conduction member 28 may be disposed opposite an area around the separation area B because the small heat generation amount in the separation area B decreases the temperature in the area around the separation area B. For example, the first high thermal conduction member 28 facing the enlarged separation area C (see FIG. 14A) particularly improves the heat transfer efficiency of the separation area B and the area around the separation area B in the arrangement direction and reduces the temperature unevenness of the heater 22 in the arrangement direction. In particular, the first high thermal conduction member 28 facing the entire region of the heat generation portion 35 in the arrangement direction reduces the temperature unevenness of the heater 22 (and the fixing belt 20) in the arrangement direction.

Next, different embodiments of the fixing device are described.

Figure 22:
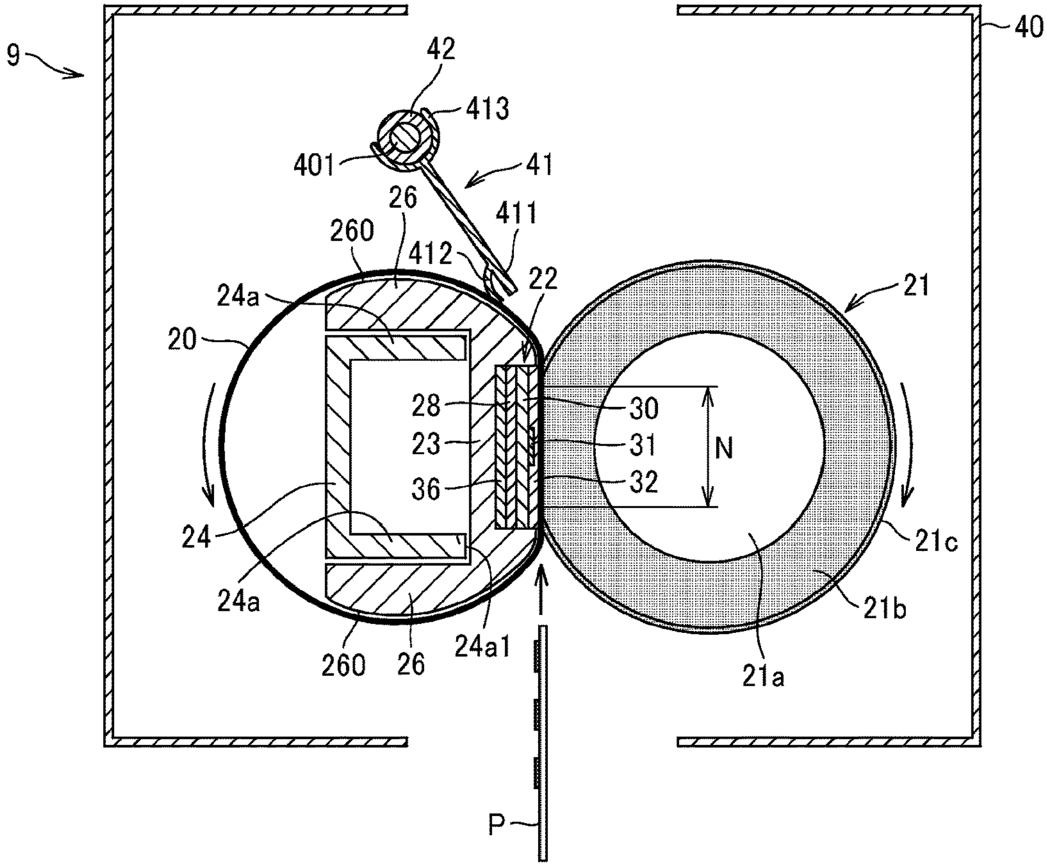
FIG. 22 is a schematic sectional side view of the fixing device according to an embodiment different from FIG. 2.

As illustrated in FIG. 22, the fixing device 9 according to the present embodiment includes a second high thermal conduction member 36 between the heater holder 23 and the first high thermal conduction member 28. The second high thermal conduction member 36 is disposed at a position different from the position of the first high thermal conduction member 28 in the lateral direction in FIG. 22 that is a direction in which the heater holder 23, the stay 24, and the first high thermal conduction member 28 are layered. Specifically, the second high thermal conduction member 36 is disposed so as to overlap the first high thermal conduction member 28. FIG. 22 illustrates a schematic cross section of the fixing device 9 including the second high thermal conduction member 36 that transmits heat in the arrangement direction, and the position of the schematic cross section is different from the position of the thermistor 25 illustrated in FIG. 2.

The second high thermal conduction member 36 is made of a material having thermal conductivity higher than the thermal conductivity of the base 30, for example, graphene or graphite. In the present embodiment, the second high thermal conduction member 36 is made of a graphite sheet having a thickness of 1 mm. Alternatively, the second high thermal conduction member 36 may be a plate made of aluminum, copper, silver, or the like.

Figure 23:
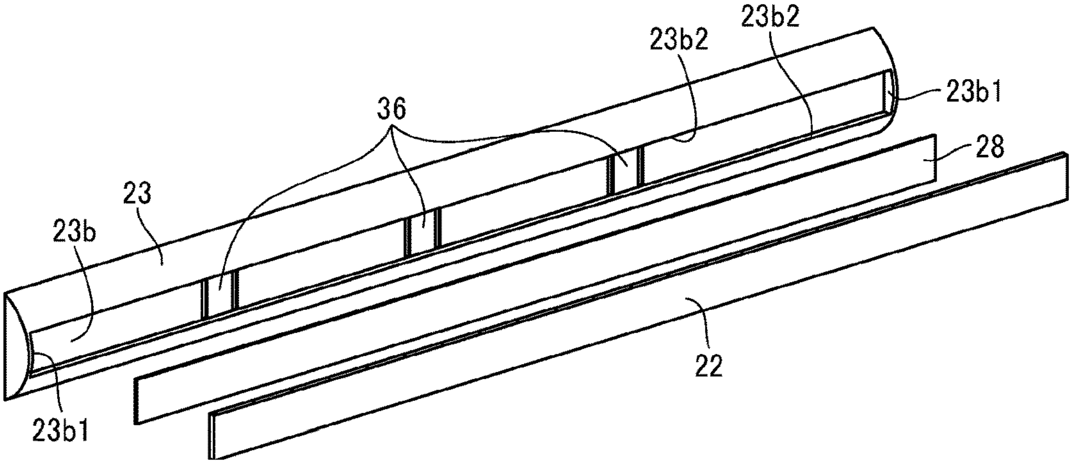
FIG. 23 is a perspective view of the heater, the first high thermal conduction member, a second high thermal conduction member, and the heater holder.

As illustrated in FIG. 23, a plurality of the second high thermal conduction members 36 are disposed on a plurality of portions of the heater holder 23 in the arrangement direction. The recessed portion 23*b* of the heater holder 23 has a plurality of holes in which the second high thermal conduction members 36 are disposed. Clearances are formed between the heater holder 23 and both sides of the second high thermal conduction member 36 in the arrangement direction. The clearance prevents heat transfer from the second high thermal conduction member 36 to the heater holder 23, and the heater 22 can efficiently heat the fixing belt 20. In FIG. 23, the guide 26 in FIG. 2 is omitted.

Figure 24:
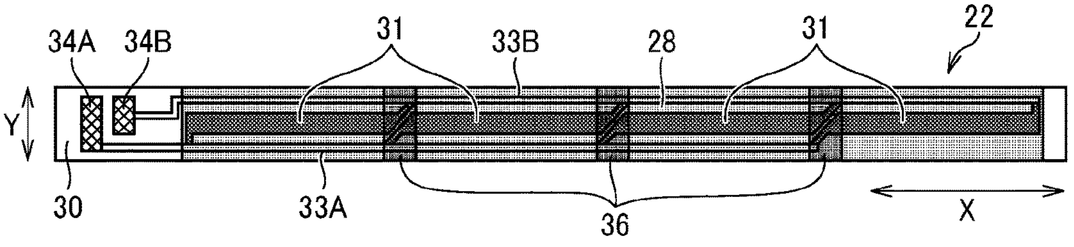
FIG. 24 is a plan view of the heater to illustrate an arrangement of the first high thermal conduction member and the second high thermal conduction member.

As illustrated in FIG. 24, each of the second high thermal conduction members 36 (see the hatched portions) is disposed at a position corresponding to the separation area B in the arrangement direction and faces at least a part of each of the neighboring resistive heat generators 31 in the arrangement direction. In particular, each of the second high thermal conduction members 36 in the present embodiment faces the entire separation area B. In FIG. 24 (and FIG. 28 to be described later), the first high thermal conduction member 28 faces the heat generation portion 35 extending in the arrangement direction, but the first high thermal conduction member 28 according to the present embodiment is not limited this as described above.

Figure 25:
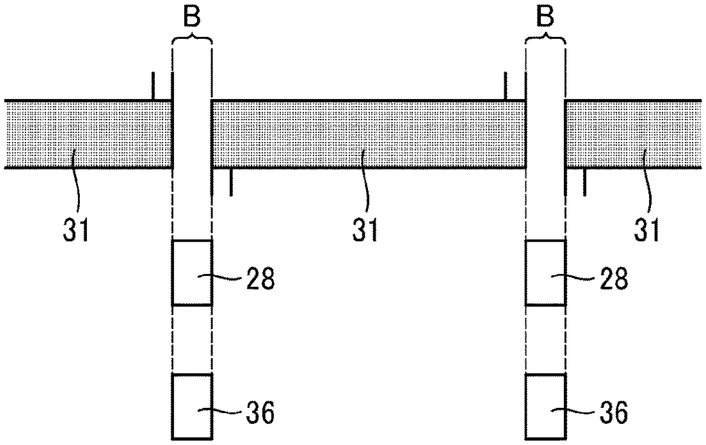
FIG. 25 is a schematic diagram illustrating a different arrangement of the first high thermal conduction members and the second high thermal conduction members from the arrangement in FIG. 24.

The fixing device 9 according to the present embodiment includes the second high thermal conduction member 36 disposed at the position corresponding to the separation area B in the arrangement direction and the position at which at least a part of each of the neighboring resistive heat generators 31 faces the second high thermal conduction member 36 in addition to the first high thermal conduction member 28. The above-described structure particularly improves the heat transfer efficiency in the separation area B in the arrangement direction and further reduces the temperature unevenness of the heater 22 in the arrangement direction. As illustrated in FIG. 25, the first high thermal conduction members 28 and the second high thermal conduction member 36 may be disposed opposite the entire gap area between the resistive heat generators 31. The above-described structure improves the heat transfer efficiency of the part of the heater 22 corresponding to the gap area to be higher than the heat transfer efficiency of the other part of the heater 22. In FIG. 25, for the sake of convenience, the resistive heat generator 31, the first high thermal conduction member 28, and the second high thermal conduction member 36 are shifted in the vertical direction of FIG. 25 but are disposed at substantially the same position in the direction intersecting the arrangement direction. However, the present disclosure is not limited to the above. The first high thermal conduction member 28 and the second high thermal conduction member 36 may be disposed opposite a part of the resistive heat generators 31 in the direction intersecting the arrangement direction or may be disposed so as to cover the entire resistive heat generators 31 in the direction intersecting the arrangement direction.

In one embodiment different from the embodiments described above, each of the first high thermal conduction member 28 and the second high thermal conduction member 36 is made of a graphene sheet. The first high thermal conduction member 28 and the second high thermal conduction member 36 made of the graphene sheet have high thermal conductivity in a predetermined direction along the plane of the graphene, that is, not in the thickness direction but in the arrangement direction. Accordingly, the above-described structure can effectively reduce the temperature unevenness of the fixing belt 20 in the arrangement direction and the temperature unevenness of the heater 22 in the arrangement direction.

Figure 26:
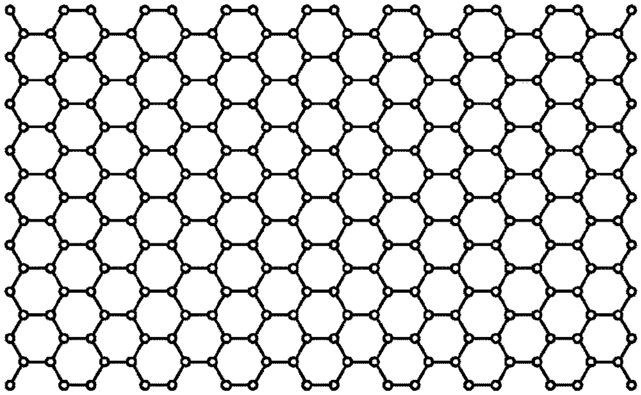
FIG. 26 is a schematic diagram illustrating a two dimensional atomic crystal structure of graphene.

Graphene is a flaky powder. Graphene has a planar hexagonal lattice structure of carbon atoms, as illustrated in FIG. 26. The graphene sheet is usually a single layer. The single layer of carbon may contain impurities. The graphene may have a fullerene structure. The fullerene structures are generally recognized as compounds including an even number of carbon atoms, which form a cage-like fused ring polycyclic system with five and six membered rings, including, for example, C60, C70, and C80 fullerenes or other closed cage structures having three-coordinate carbon atoms.

Graphene sheets are artificially made by, for example, a chemical vapor deposition (CVD) method.

The graphene sheet is commercially available. The size and thickness of the graphene sheet or the number of layers of the graphite sheet described later are measured by, for example, a transmission electron microscope (TEM).

Figure 27:
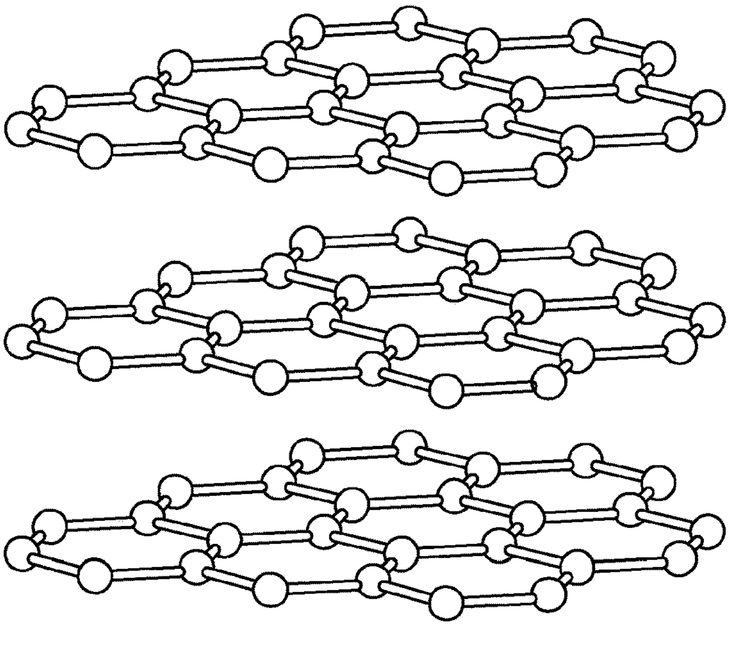
FIG. 27 is a schematic diagram illustrating a three dimensional atomic crystal structure of graphite.

Graphite obtained by multilayering graphene has a large thermal conduction anisotropy. As illustrated in FIG. 27, graphite has a crystal structure formed by layering a number of layers each having a condensed six membered ring layer plane of carbon atoms extending in a planar shape. Among carbon atoms in this crystal structure, adjacent carbon atoms in the layer are coupled by a covalent bond, and carbon atoms between layers are coupled by a van der Waals bond. The covalent bond has a larger bonding force than a van der Waals bond. Therefore, there is a large anisotropy between the bond between carbon atoms in a layer and the bond between carbon atoms in different layers. That is, the first high thermal conduction member 28 and the second high thermal conduction member 36 that are made of graphite each have the heat transfer efficiency in the arrangement direction larger than the heat transfer efficiency in the thickness direction of the first high thermal conduction member 28 and the second high thermal conduction member 36 (that is, the stacking direction of these members), reducing the heat transferred to the heater holder 23. Accordingly, the above-described structure can efficiently decrease the temperature unevenness of the heater 22 in the arrangement direction and can minimize the heat transferred to the heater holder 23. Since the first high thermal conduction member 28 and the second high thermal conduction member 36 that are made of graphite are not oxidized at about 700 degrees or lower, the first high thermal conduction member 28 and the second high thermal conduction member 36 each have an excellent heat resistance.

The physical properties and dimensions of the graphite sheet may be appropriately changed according to the function required for the first high thermal conduction member 28 or the second high thermal conduction member 36. For example, the anisotropy of the thermal conduction can be increased by using high-purity graphite or single-crystal graphite or increasing the thickness of the graphite sheet. Using a thin graphite sheet can reduce the thermal capacity of the fixing device 9 so that the fixing device 9 can perform high speed printing. A width of the first high thermal conduction member 28 or a width of the second high thermal conduction member 36 in the direction intersecting the arrangement direction may be increased in response to a large width of the fixing nip N or a large width of the heater 22.

From the viewpoint of increasing mechanical strength, the number of layers of the graphite sheet is preferably 11 or more. The graphite sheet may partially include a single layer portion and a multilayer portion.

Figure 28:
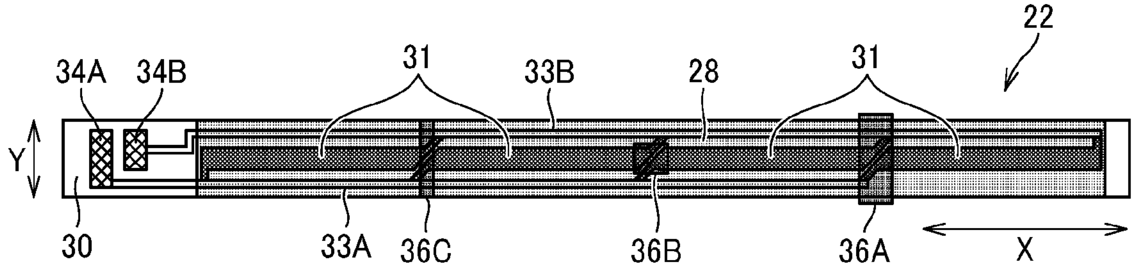
FIG. 28 is a plan view of the heater having a different arrangement of the second high thermal conduction member from the arrangement in FIG. 24.

As long as the second high thermal conduction member 36 faces a part of each of neighboring resistive heat generators 31 and at least a part of the gap area between the neighboring resistive heat generators 31, the configuration of the second high thermal conduction member 36 is not limited to the configuration illustrated in FIG. 24. For example, as illustrated in FIG. 28, a second high thermal conduction member 36A is longer than the base 30 in the direction intersecting the arrangement direction, and both ends of the second high thermal conduction member 36A in the direction intersecting the arrangement direction are outside the base 30 in FIG. 28. A second high thermal conduction member 36B faces a range in which the resistive heat generator 31 is disposed in the direction intersecting the arrangement direction. A second high thermal conduction member 36C faces a part of the gap area and a part of each of neighboring resistive heat generators 31.

Figure 29:
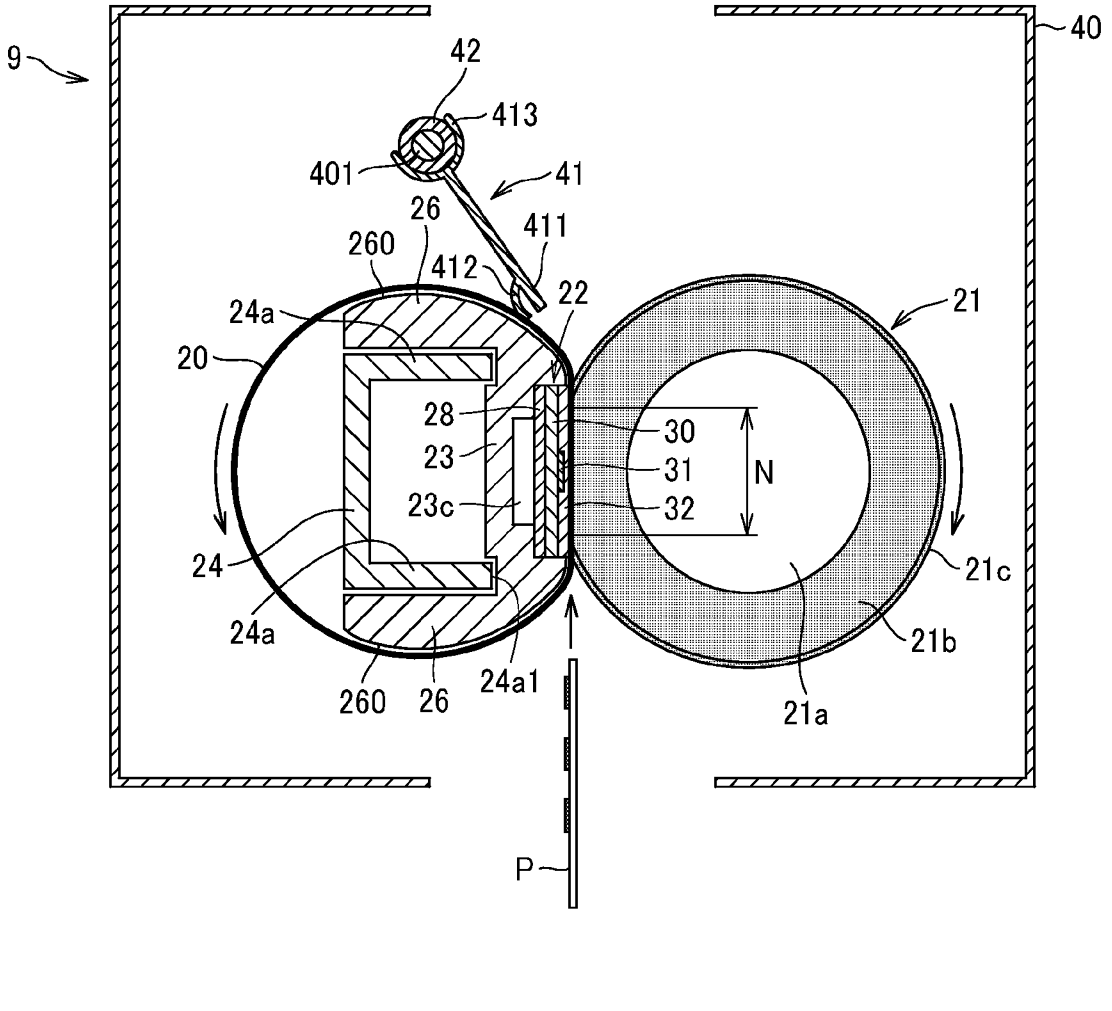
FIG. 29 is a schematic sectional side view of the fixing device different from the fixing devices illustrated in FIGS. 2 and 22.

As illustrated in FIG. 29, the fixing device according to the present embodiment has a gap between the first high thermal conduction member 28 and the heater holder 23 in the thickness direction that is the lateral direction in FIG. 29. In other words, the fixing device 9 has a gap 23*c* serving as a thermal insulation layer. In the arrangement direction, the gap 23*c* is in a portion included in the recessed portion 23*b* (see FIG. 23) in the heater holder 23 to set the first high thermal conduction member 28 and the second high thermal conduction member 36, but the second high thermal conduction member 36 is not set in the portion of the gap 23*c*. In the direction intersecting the arrangement direction, the gap 23*c* is in a portion of the recessed portion 23*b* having a depth deeper than other portions to receive the first high thermal conduction member 28. The above-described structure minimizes the contact area between the heater holder 23 and the first high thermal conduction member 28. Minimizing the contact area prevents heat transfer from the first high thermal conduction member 28 to the heater holder 23 and enables the heater 22 to efficiently heat the fixing belt 20. In the cross section of the fixing device 9 in which the second high thermal conduction member 36 is set, the second high thermal conduction member 36 is in contact with the heater holder 23 as illustrated in FIG. 22 of the above-described embodiment.

In particular, the fixing device 9 according to the present embodiment has the gap 23*c* facing the entire area of the resistive heat generators 31 in the direction intersecting the arrangement direction that is the vertical direction in FIG. 29. The gap 23*c* prevents heat transfer from the first high thermal conduction member 28 to the heater holder 23, and the heater 22 can efficiently heat the fixing belt 20. The fixing device 9 may include a thermal insulation layer made of heat insulator having a lower thermal conductivity than the thermal conductivity of the heater holder 23 instead of a space like the gap 23*c* serving as the thermal insulation layer.

In the above description, the second high thermal conduction member 36 is a member different from the first high thermal conduction member 28, but the present embodiment is not limited to this. For example, the first high thermal conduction member 28 may have a thicker portion than the other portion so that the thicker portion faces the separation area B.

The fixing device in the embodiments illustrated in FIGS. 22 and 29 may also have the above-described configuration including the fixing device frame 40, the separation plate 41, the collar 42, the torsion spring 44, and the like. The above-described fixing device also can secure the certain degree of insulation between the separation plate 41 and the fixing device frame 40 and between the torsion spring 44 and the fixing device frame 40.

The above-described embodiments are illustrative and do not limit this disclosure. It is therefore to be understood that within the scope of the appended claims, numerous additional modifications and variations are possible to this disclosure otherwise than as specifically described herein.

Figure 30:
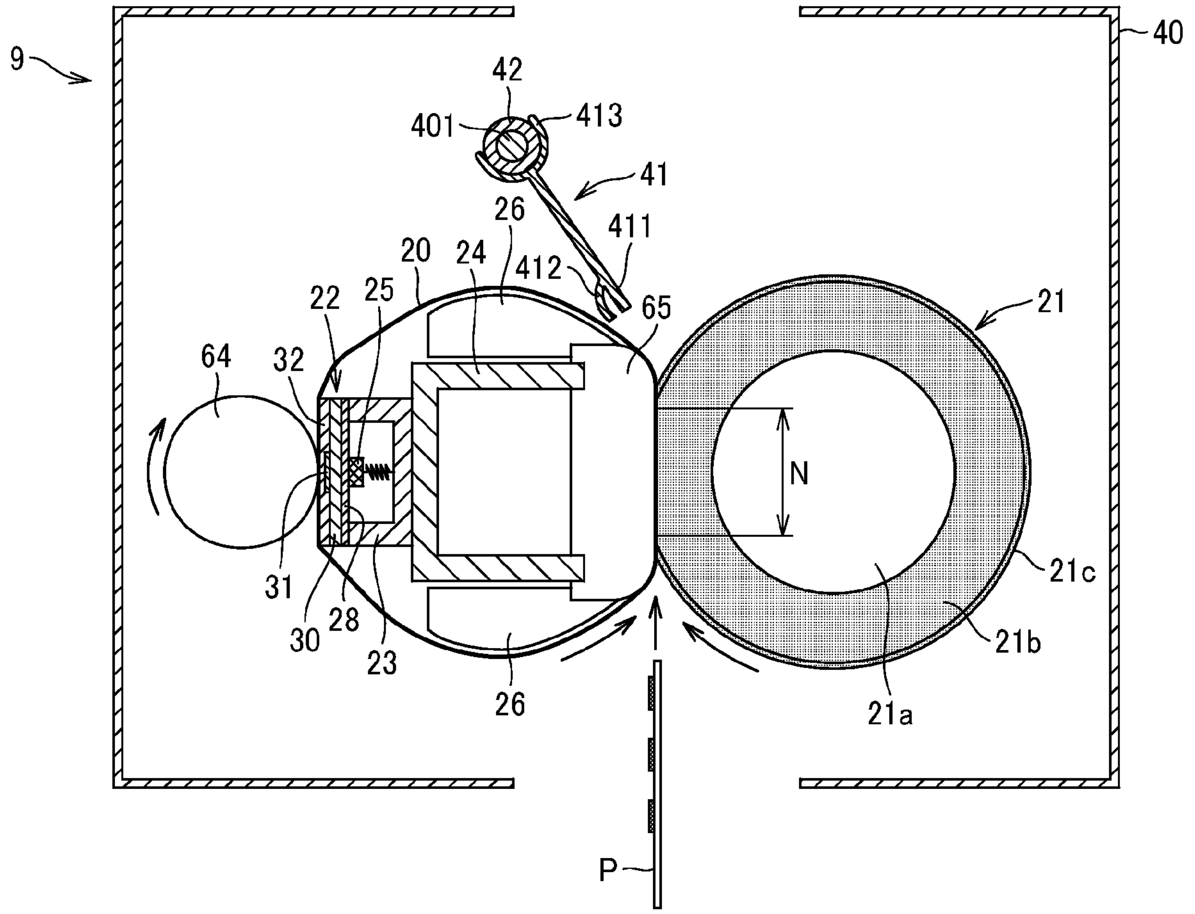
FIG. 30 is a schematic sectional side view of the fixing device different from the fixing devices of FIGS. 2, 22, and 29.
Figure 31:
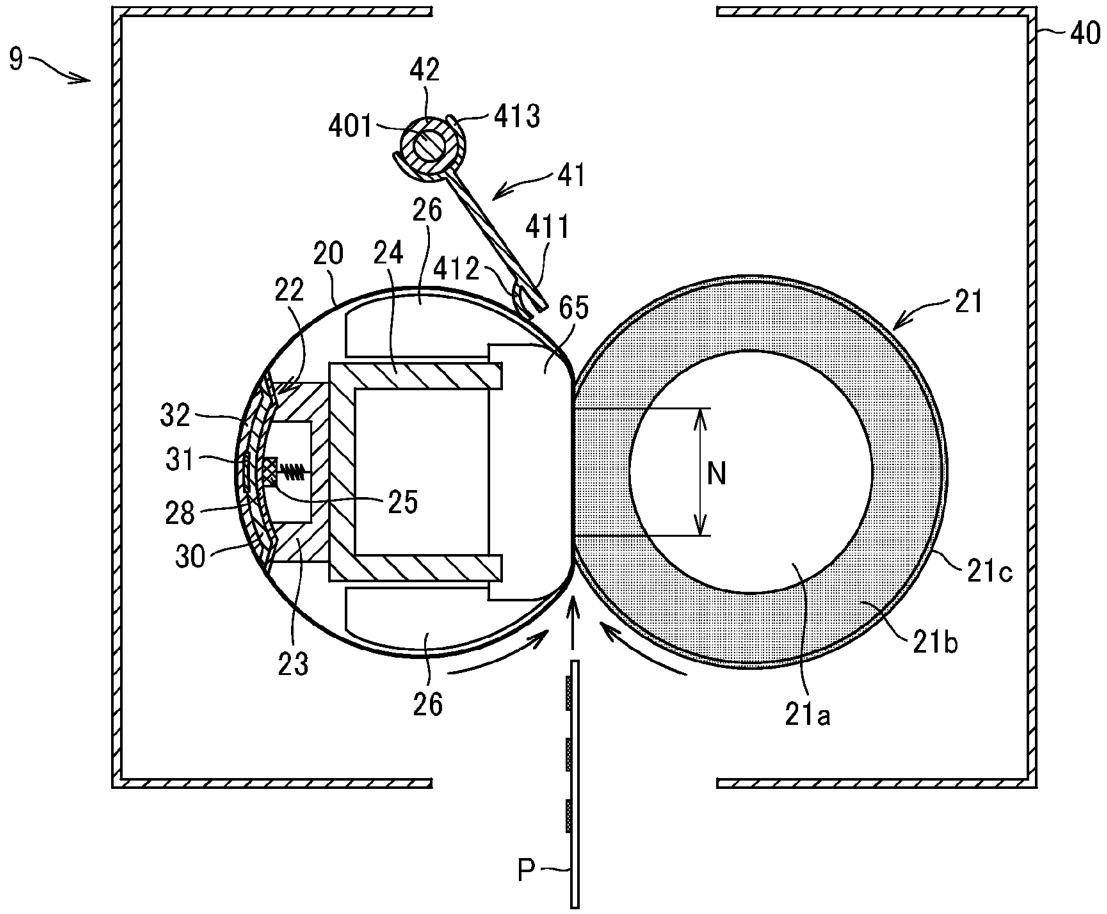
FIG. 31 is a schematic sectional view of the fixing device different from the fixing devices of FIGS. 2, 22, 29, and 30.
Figure 32:
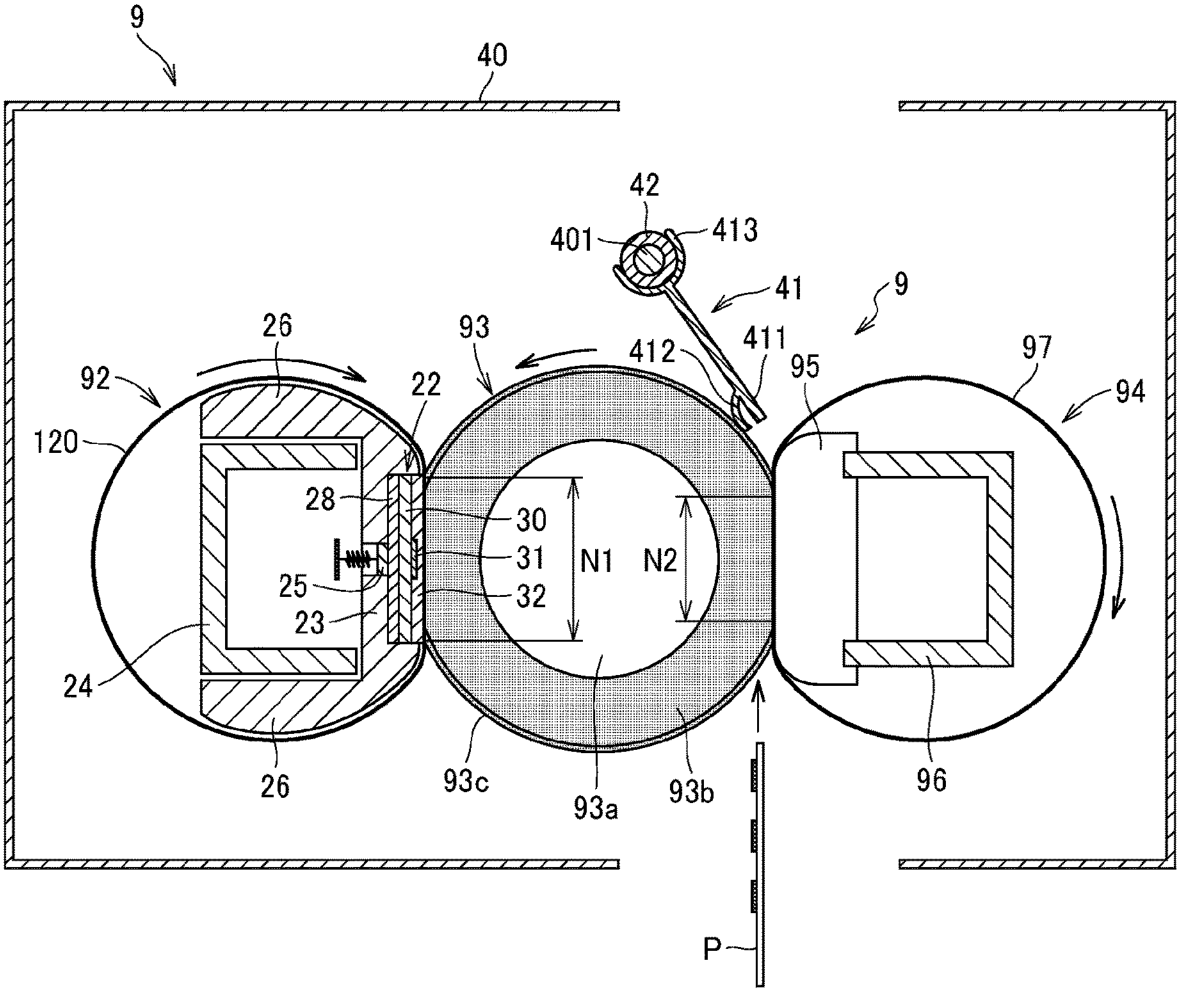
FIG. 32 is a schematic sectional view of the fixing device different from the fixing devices of FIGS. 2, 22, and 29 to 31.

The embodiments of the present disclosure are also applicable to fixing devices as illustrated in FIGS. 30 to 32, respectively, in addition to the fixing device 9 described above. Hereinafter, the configuration of each fixing device illustrated in FIGS. 30 to 32 are briefly described.

First, the fixing device 9 illustrated in FIG. 30 includes a pressurization roller 64 opposite the pressure roller 21 with respect to the fixing belt 20. The fixing belt 20 is sandwiched by the pressurization roller 64 and the heater 22 and heated by the heater 22. On the other hand, a nip formation pad 65 serving as a nip former is disposed inside the loop formed by the fixing belt 20 and disposed opposite the pressure roller 21. The nip formation pad 65 is supported by the stay 24. The nip formation pad 65 sandwiches the fixing belt 20 together with the pressure roller 21, thereby forming the fixing nip N.

A description is provided of the construction of the fixing device 9 as illustrated in FIG. 31. The fixing device 9 does not include the pressurization roller 64 described above with reference to FIG. 30. In order to attain a contact length for which the heater 22 contacts the fixing belt 20 in the circumferential direction thereof, the heater 22 is curved into an arc in cross section that corresponds to a curvature of the fixing belt 20. Other parts of the fixing device 9 illustrated in FIG. 31 are the same as the fixing device 9 illustrated in FIG. 30.

The fixing device in the embodiments illustrated in FIGS. 30 and 31 may also have the above-described configuration including the fixing device frame 40, the separation plate 41, the collar 42, the torsion spring 44, and the like. The above-described fixing device also can secure the certain degree of insulation between the separation plate 41 and the fixing device frame 40 and between the torsion spring 44 and the fixing device frame 40.

Finally, the fixing device 9 illustrated in FIG. 32 is described. The fixing device 9 includes a heating assembly 92, a fixing roller 93 as the fixing rotator, and a pressure assembly 94 that is a facing member. The heating assembly 92 includes the heater 22, the first high thermal conduction member 28, the heater holder 23, the stay 24, which are described in the above embodiments, and a heating belt 120. The fixing roller 93 is an opposed rotator that rotates and faces the heating belt 120 as the rotator. The fixing roller 93 includes a core 93*a* as the first layer, an elastic layer 93*b* as the second layer, and a surface layer 93*c* as the third layer. The core 93*a* is electrically conductive. The elastic layer 93*b* is not electrically conductive. The surface layer 93*c* is electrically conductive. The pressure assembly 94 is opposite to the heating assembly 92 with respect to the fixing roller 93. The pressure assembly 94 includes a nip formation pad 95 and a stay 96 inside the loop of a pressure belt 97, and the pressure belt 97 is rotatably arranged to wrap around the nip formation pad 95 and the stay 96 and serves as the opposed rotator. The sheet P passes through the fixing nip N2 between the pressure belt 97 and the fixing roller 93 to be heated and pressed to fix the image onto the sheet P.

The fixing device in the embodiment illustrated in FIG. 32 may also have the above-described configuration including the fixing device frame 40, the separation plate 41 in contact with the fixing roller 93, the collar 42, the torsion spring 44, and the like. The above-described fixing device also can secure the certain degree of insulation between the separation plate 41 and the fixing device frame 40 and between the torsion spring 44 and the fixing device frame 40.

The image forming apparatus according to the present embodiments of the present disclosure is applicable not only to the color image forming apparatus illustrated in FIG. 1 but also to a monochrome image forming apparatus, a copier, a printer, a facsimile machine, or a multifunction peripheral including at least two functions of the copier, printer, and facsimile machine.

Figure 33:
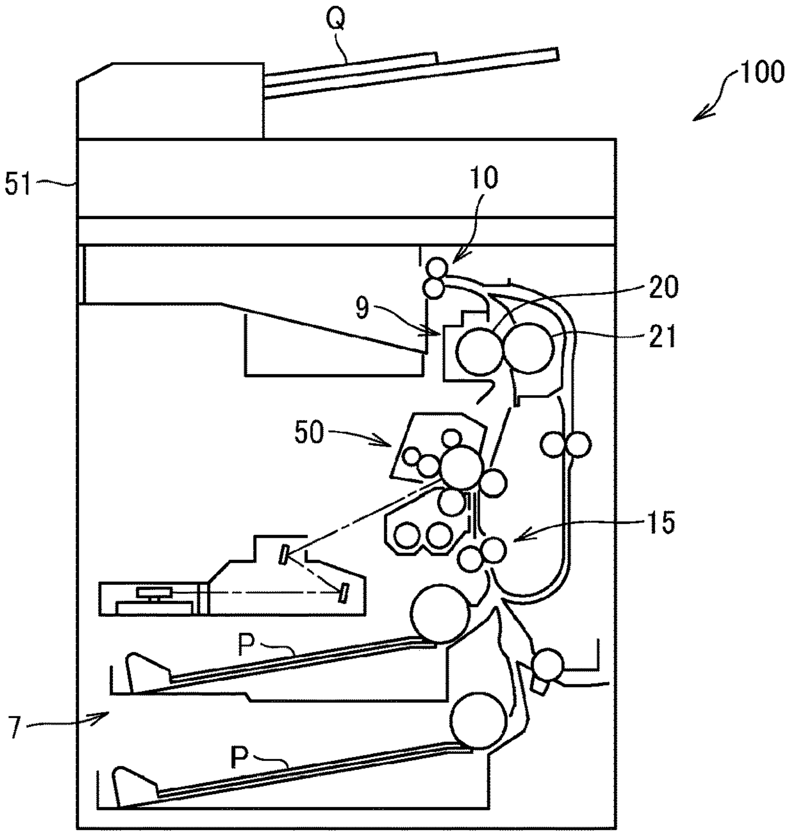
FIG. 33 is a schematic sectional view of an image forming apparatus different from the image forming apparatus of FIG. 1.

With reference to FIG. 33, the following describes another image forming apparatus in which the above-described embodiments may be applied. For example, as illustrated in FIG. 33, the image forming apparatus 100 according to the present embodiment includes an image forming device 50 including a photoconductor drum and the like, the sheet conveyer including the timing roller pair 15 and the like, the sheet feeder 7, the fixing device 9, the sheet ejection device 10, and a reading device 51. The sheet feeder 7 includes the plurality of sheet feeding trays, and the sheet feeding trays stores sheets of different sizes, respectively.

The reading device 51 reads an image of a document Q. The reading device 51 generates image data from the read image. The sheet feeder 7 stores the plurality of sheets P and feeds the sheet P to the conveyance path. The timing roller pair 15 conveys the sheet P on the conveyance path to the image forming device 50.

The image forming device 50 forms a toner image on the sheet P. Specifically, the image forming device 50 includes the photoconductor drum, a charging roller, the exposure device, the developing device, a supply device, a transfer roller, the cleaning device, and a discharging device. The toner image is, for example, an image of the document Q. The fixing device 9 heats and presses the toner image to fix the toner image on the sheet P. Conveyance rollers convey the sheet P on which the toner image has been fixed to the sheet ejection device 10. The sheet ejection device 10 ejects the sheet P to the outside of the image forming apparatus 100.

Next, the fixing device 9 of the present embodiment is described. Description of configurations common to those of the fixing devices of the above-described embodiments is omitted as appropriate.

Figure 34:
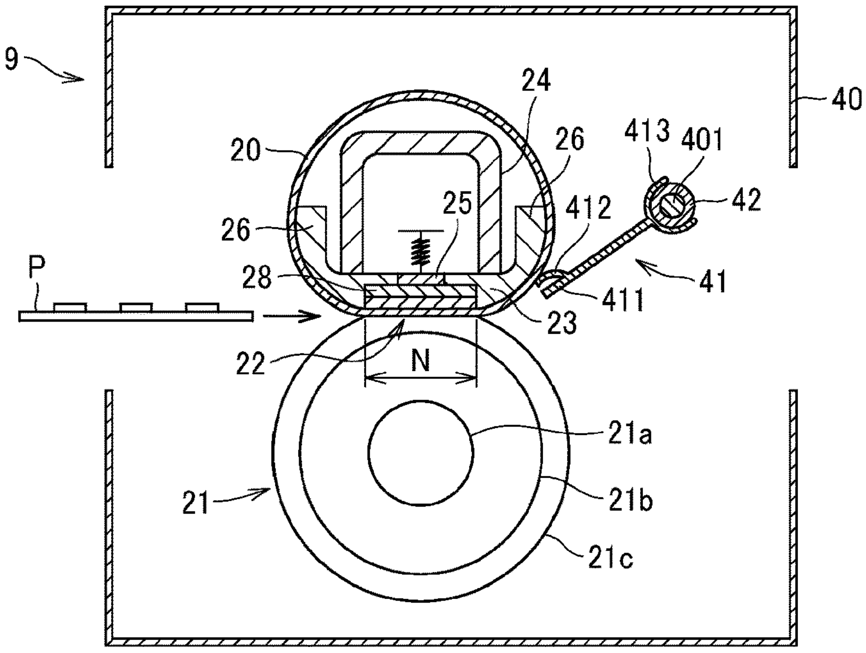
FIG. 34 is a schematic sectional side view of the fixing device according to an embodiment of the present disclosure.

As illustrated in FIG. 34, the fixing device 9 includes the fixing belt 20, the pressure roller 21, the heater 22, the heater holder 23, the stay 24, the thermistors 25, the first high thermal conduction member 28, and the separation plate 41.

The fixing nip N is formed between the fixing belt 20 and the pressure roller 21. The nip width of the fixing nip N is 10 mm, and the linear velocity of the fixing device 9 is 240 mm/s.

The fixing belt 20 includes a polyimide base and the release layer and does not include the elastic layer. The release layer is made of a heat-resistant film material made of, for example, fluororesin. The outer loop diameter of the fixing belt 20 is about 24 mm.

The pressure roller 21 includes the core 21*a*, the elastic layer 21*b*, and the surface layer 21*c*. The pressure roller 21 has an outer diameter of 24 to 30 mm, and the elastic layer 21*b* has a thickness of 3 to 4 mm.

The heater 22 includes the base, the thermal insulation layer, a conductor layer including the resistive heat generator and the like, and the insulation layer, and is formed to have a thickness of 1 mm as a whole. A width Y of the heater 22 in the direction intersecting the arrangement direction is 13 mm.

Figure 35:
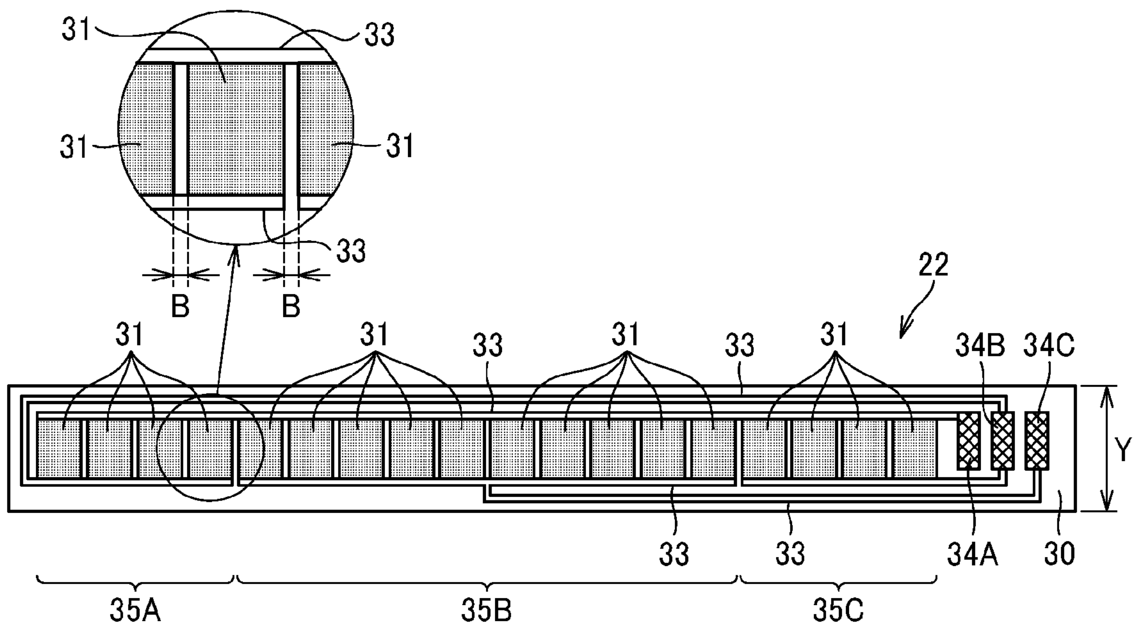
FIG. 35 is a plan view of the heater in the fixing device of FIG. 34.

As illustrated in FIG. 35, the conductor layer of the heater 22 includes a plurality of resistive heat generators 31, power supply lines 33, and electrodes 34A to 34C. As illustrated in the enlarged view of FIG. 35, the separation area B is formed between neighboring resistive heat generators of the plurality of resistive heat generators 31 arranged in the arrangement direction. The enlarged view of FIG. 35 illustrates two separation areas B, but the separation area B is formed between neighboring resistive heat generators of all the plurality of resistive heat generators 31. The resistive heat generators 31 configure three heat generation portions 35A to 35C. When a current flows between the electrodes 34A and 34B, the heat generation portions 35A and 35C generate heat. When a current flows between the electrodes 34A and 34C, the heat generation portion 35B generates heat. When the fixing device 9 fixes the toner image onto the small sheet, the heat generation portion 35B generates heat. When the fixing device 9 fixes the toner image onto the large sheet, all the heat generation portions 35A to 35C generate heat.

Figure 36:
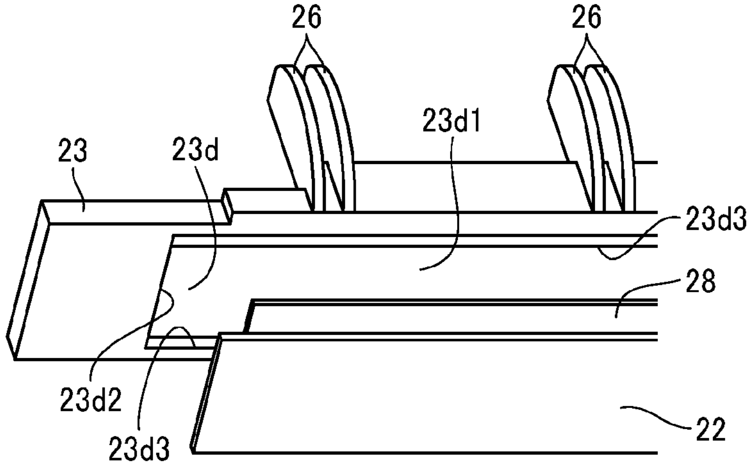
FIG. 36 is a partial perspective view of the heater and the heater holder in the fixing device of FIG. 34.

As illustrated in FIG. 36, the heater holder 23 holds the heater 22 and the first high thermal conduction member 28 in a recessed portion 23*d*. The recessed portion 23*d* is formed on the side of the heater holder 23 facing the heater 22. The recessed portion 23*d* has a bottom surface 23*d*1 and walls 23*d*2 and 23*d*3. The bottom surface 23*d*1 is substantially parallel to the base 30 and the surface recessed from the side of the heater holder 23 toward the stay 24. The walls 23*d*2 are both side surfaces of the recessed portion 23*d* in the arrangement direction. The recessed portion 23*d* may have one wall 23*d*2. The walls 23*d*3 are both side surfaces of the recessed portion 23*d* in the direction intersecting the arrangement direction. The heater holder 23 has guides 26. The heater holder 23 is made of LCP.

Figure 37:
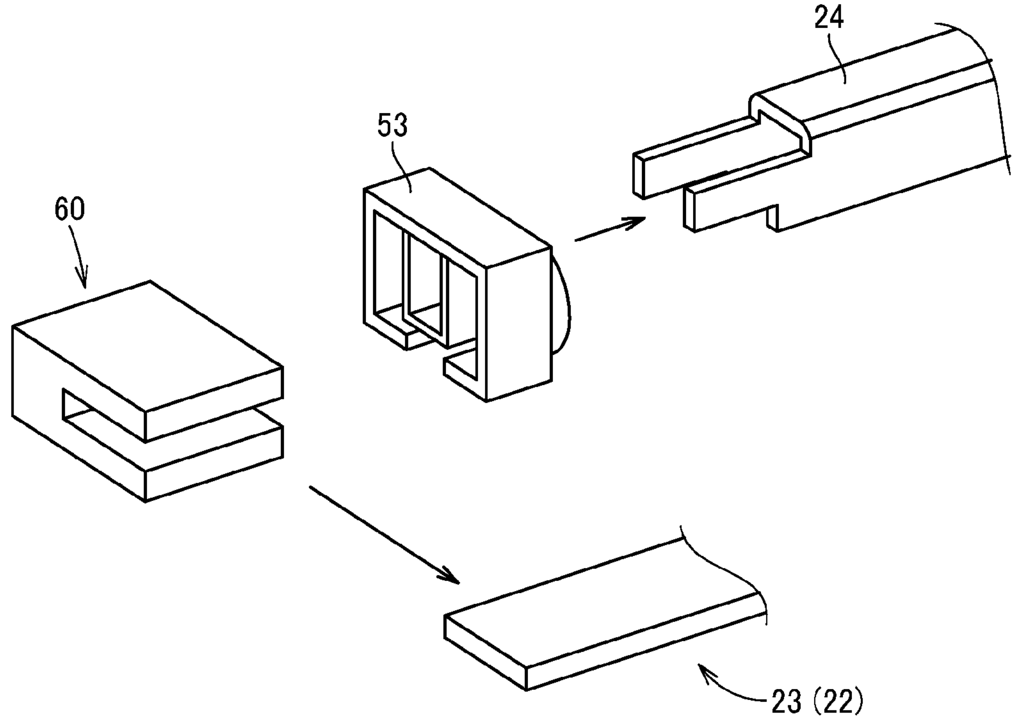
FIG. 37 is a perspective view of a connector attached to the heater.

As illustrated in FIG. 37, a connector 60 includes a housing made of resin such as LCP and a plurality of contact terminals fixed to the housing.

The connector 60 is attached to the heater 22 and the heater holder 23 such that a front side of the heater 22 and the heater holder 23 and a back side of the heater 22 and the heater holder 23 are sandwiched by the connector 60. In this state, the contact terminals contact and press against the electrodes of the heater 22, respectively and the heat generation portions 35 are electrically coupled to the power supply provided in the image forming apparatus via the connector 60. The above-described configuration enables the power supply to supply power to the heat generation portion 35. Note that at least a part of each of the electrodes 34A to 34C is not coated by the insulation layer and therefore exposed to secure connection with the connector 60.

A flange 53 contacts the inner circumferential surface of the fixing belt 20 at each of both ends of the fixing belt 20 in the arrangement direction to hold the fixing belt 20. The flange 53 is fixed to the housing of the fixing device 9. The flange 53 is inserted into each of both ends of the stay 24 (see an arrow direction from the flange 53 in FIG. 37).

To attach to the heater 22 and the heater holder 23, the connector 60 is moved in the direction intersecting the arrangement direction (see a direction indicated by arrow from the connector 60 in FIG. 37). The connector 60 and the heater holder 23 may have a convex portion and a recessed portion to attach the connector 60 to the heater holder 23. The convex portion disposed on one of the connector 60 and the heater holder 23 is engaged with the recessed portion disposed on the other and relatively move in the recessed portion to attach the connector 60 to the heater holder 23. The connector 60 is attached to one end of the heater 22 and one end of the heater holder 23 in the arrangement direction. The one end of the heater 22 and the one end of the heater holder 23 are farther from a portion in which the pressure roller 21 receives a driving force from a drive motor than the other end of the heater 22 and the other end of the heater holder 23, respectively.

Figure 38:
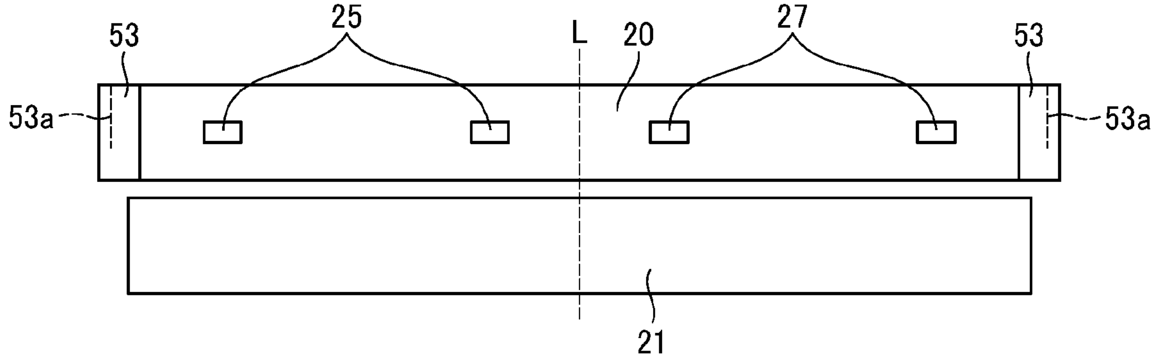
FIG. 38 is a schematic diagram illustrating an arrangement of thermistors and thermostats.

As illustrated in FIG. 38, one thermistor 25 faces a center portion of the inner circumferential surface of the fixing belt 20 in the arrangement direction, and another thermistor 25 faces an end portion of the inner circumferential surface of the fixing belt 20 in the arrangement direction. The heater 22 is controlled based on the temperature of the center portion of the fixing belt 20 and the temperature of the end portion of the fixing belt 20 in the arrangement direction that are detected by the thermistors 25.

As illustrated in FIG. 38, one thermostat 27 faces a center portion of the inner circumferential surface of the fixing belt 20 in the arrangement direction, and another thermostat 27 faces an end portion of the inner circumferential surface of the fixing belt 20 in the arrangement direction. Each of the thermostats 27 shuts off a current to the heater 22 in response to a detection of a temperature of the fixing belt 20 higher than a predetermined threshold value.

Flanges 53 are disposed at both ends of the fixing belt 20 in the arrangement direction and hold both ends of the fixing belt 20, respectively. The flange 53 is made of LCP.

Figure 39:
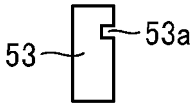
FIG. 39 is a schematic diagram illustrating a groove of a flange.

As illustrated in FIG. 39, the flange 53 has a slide groove 53*a*. The slide groove 53*a* extends in a direction in which the fixing belt 20 moves toward and away from the pressure roller 21. An engaging portion of the housing of the fixing device 9 is engaged with the slide groove 53*a*. The relative movement of the engaging portion in the slide groove 53*a* enables the fixing belt 20 to move toward and away from the pressure roller 21.

The above-described fixing device 9 may also have the above-described configuration including the fixing device frame 40, the separation plate 41, the collar 42, the torsion spring 44, and the like. The above-described fixing device also can secure the certain degree of insulation between the separation plate 41 and the fixing device frame 40 and between the torsion spring 44 and the fixing device frame 40.

The sheets P serving as recording media may be thick paper, postcards, envelopes, plain paper, thin paper, coated paper, art paper, tracing paper, overhead projector (OHP) transparencies, plastic film, prepreg, copper foil, and the like.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

This patent application is based on International Patent Application No. PCT/IB2022/062561, filed Dec. 20, 2022, which claims priority to Japanese Patent Application No. 2022-012017, filed on Jan. 28, 2022, in the Japan Patent Office, the entire disclosure of which is hereby incorporated by reference herein.

REFERENCE SIGNS LIST

1 Image forming apparatus
9 Fixing device (Heating device)
20 Fixing belt (Fixing rotator or Fixing member)
21 Pressure roller (Opposed rotator or Pressure rotator)
40 Fixing device frame (Housing)
41 Separation plate (Separator)
411 Separation portion
412 Abutment portion
413 Attachment portion
42 Collar (Resistor)
44 Torsion spring (Biasing member)
45 Thermal equalization plate (Conductive member)
C Sheet passing region (Region through which recording medium having maximum width passes)

The invention claimed is:

1. A fixing device comprising:
a rotator;
an opposed rotator opposite the rotator;
a heater including a resistive heat generator, the heater being in direct contact with an inner circumferential surface of the rotator or being in contact with the inner circumferential surface of the rotator via a conductor to heat the rotator;
a conductive housing grounded;
a resistor in the housing;
a conductive separator being in contact with the rotator and assembled into the housing via the resistor, and
a biasing member to bias the separator against the rotator, the biasing member being assembled into the housing via the resistor,
the separator and the housing are disposed at a distance equal to or greater than a creepage distance of 2.5 mm and equal to or greater than an air clearance of 2.2 mm, and
the biasing member and the housing are disposed at a distance equal to or greater than the creepage distance of 2.5 mm and equal to or greater than the air clearance of 2.2 mm.

2. The fixing device according to claim 1, wherein:
the heater includes an insulation layer between the resistive heat generator and the rotator.

3. The fixing device according to claim 1, wherein:
the resistor includes conductive resin.

4. The fixing device according to claim 1, wherein:
the resistor has a volume resistance of 100 kΩ or more.

5. The fixing device according to claim 1, wherein:
the separator is in contact with the rotator at a position outside a passing region of a recording medium having a maximum width, among recording media for use in the fixing device, in a width direction of the recording medium.

6. The fixing device according to claim 1, wherein:
the separator is in contact with the rotator at both end positions outside a passing region of a recording medium having a maximum width, among recording media for use in the fixing device, in a width direction of the recording medium.

7. A fixing device, comprising:

a rotator;

an opposed rotator opposite the rotator;

a heater including a resistive heat generator, the heater being in direct contact with an inner circumferential surface of the rotator or being in contact with the inner circumferential surface of the rotator via a conductor to heat the rotator;

a conductive housing grounded;

a resistor in the housing;

a conductive separator being in contact with the rotator and assembled into the housing via the resistor; and a biasing member to bias the separator against the rotator, the biasing member being assembled into the housing via the resistor, wherein the resistor is a collar, and wherein the separator is rotatably assembled into the housing via the collar.

8. The fixing device according to claim 7, further comprising:

a collar including an insulating material, wherein the separator is rotatably assembled to the housing via the collar including the insulating material.

9. An image forming apparatus comprising the fixing device according to claim 1.

10. The fixing device according to claim 1, wherein:

the biasing member includes a spring.

11. The fixing device according to claim 10, wherein:

the spring is a torsion spring.

12. The fixing device according to claim 1, wherein the heater further comprises:

a base on which the heat generator is disposed; and an insulation layer in contact with the heat generator and on an opposite side of the heat generator as the base.

13. The fixing device according to claim 12, wherein:

the insulation layer of the heater is in direct contact with the inner circumferential surface of the rotator or is in contact with the inner circumferential surface of the rotator via the conductor to heat the rotator.

14. The fixing device according to claim 7, wherein the heater further comprises:

a base on which the heat generator is disposed; and an insulation layer in contact with the heat generator and on an opposite side of the heat generator as the base.

15. The fixing device according to claim 14, wherein:

the insulation layer of the heater is in direct contact with the inner circumferential surface of the rotator or is in contact with the inner circumferential surface of the rotator via the conductor to heat the rotator.

16. The fixing device according to claim 7, wherein:

the biasing member includes a spring.

17. The fixing device according to claim 16, wherein:

the spring is a torsion spring.

* * * * *